US012657959B2

(12) United States Patent
Yang et al.

(10) Patent No.: US 12,657,959 B2
(45) Date of Patent: Jun. 16, 2026

(54) DEEP VIDEO LINKAGE FEATURE-BASED BEHAVIOR RECOGNITION METHOD

(71) Applicant: SOOCHOW UNIVERSITY, Jiangsu (CN)

(72) Inventors: Jianyu Yang, Jiangsu (CN); Yao Huang, Jiangsu (CN)

(73) Assignee: SOOCHOW UNIVERSITY, Jiangsu (CN)

( * ) Notice: Subject to any disclaimer, the term of this patent is extended or adjusted under 35 U.S.C. 154(b) by 223 days.

(21) Appl. No.: 18/685,227

(22) PCT Filed: Jun. 14, 2022

(86) PCT No.: PCT/CN2022/098508
§ 371 (c)(1),
(2) Date: Feb. 20, 2024

(87) PCT Pub. No.: WO2023/024658
PCT Pub. Date: Mar. 2, 2023

(65) Prior Publication Data
US 2024/0395069 A1 Nov. 28, 2024

(30) Foreign Application Priority Data

Aug. 23, 2021 (CN) .......................... 202110968288.1

(51) Int. Cl.
| | |
|---|---|
| *G06K 9/00* | (2022.01) |
| *G06V 10/50* | (2022.01) |
| *G06V 10/774* | (2022.01) |
| *G06V 10/82* | (2022.01) |
| *G06V 40/20* | (2022.01) |

(52) U.S. Cl.
CPC .............. *G06V 40/28* (2022.01); *G06V 10/50* (2022.01); *G06V 10/774* (2022.01); *G06V 10/82* (2022.01)

(58) Field of Classification Search
CPC ........ G06V 40/28; G06V 10/82; G06V 10/50; G06V 40/20; G06V 10/774; G06F 18/214; G06N 3/045; G06N 3/048; G06N 3/08
See application file for complete search history.

(56) References Cited

U.S. PATENT DOCUMENTS

2020/0066036 A1* 2/2020 Choi ......................... G06N 3/02
2021/0073563 A1 3/2021 Karianakis et al.
(Continued)

FOREIGN PATENT DOCUMENTS

| CN | 108038420 A | 5/2018 |
|---|---|---|
| CN | 109460734 A | 3/2019 |

(Continued)

OTHER PUBLICATIONS

Xiao, Yang, et al. "Action recognition for depth video using multi-view dynamic images." Information Sciences 480 (2019): 287-304. (Year: 2019).*

(Continued)

*Primary Examiner* — Avinash Yentrapati
(74) *Attorney, Agent, or Firm* — NKL LAW; Jae Youn Kim

(57) ABSTRACT

Provided relates to a depth video linkage feature-based behavior recognition method, comprising projecting a depth video of each behavior sample onto a front-side, a right-side, a left-side and a top-side; obtaining a dynamic image of each behavior sample by calculating a dynamic image of each projection sequence; inputting the dynamic image of each behavior sample into a respective feature extraction module and extracting features; inputting the extracted features into a multi-projection linkage feature extraction module and extracting a linkage feature of each projection combination; connecting all the extracted linkage features by channel, and inputting the connected features into an average pooling
(Continued)

layer and a fully connected layer; constructing a depth video linkage feature-based behavior recognition network; inputting a depth video of each training behavior sample into the depth video linkage feature-based behavior recognition network, and training the network till convergence; and inputting a depth video of each behavior sample.

10 Claims, 6 Drawing Sheets

(56) References Cited

U.S. PATENT DOCUMENTS

2021/0156960 A1* 5/2021 Popov ..................... G01S 13/89

2022/0415059 A1* 12/2022 Smolyanskiy ....... G06N 3/0464

FOREIGN PATENT DOCUMENTS

| | | |
|---|---|---|
| CN | 113591797 A | 11/2021 |
| CN | 113610046 A | 11/2021 |

OTHER PUBLICATIONS

Huang, Yao, et al., Learning Motion Features from Dynamic Images of Depth Video for Human Action Recognition, 2021 27th International Conference on Mechatronics and Machine Vision in Practice (M2VIP), (Feb. 11, 2022), 258-263.

* cited by examiner

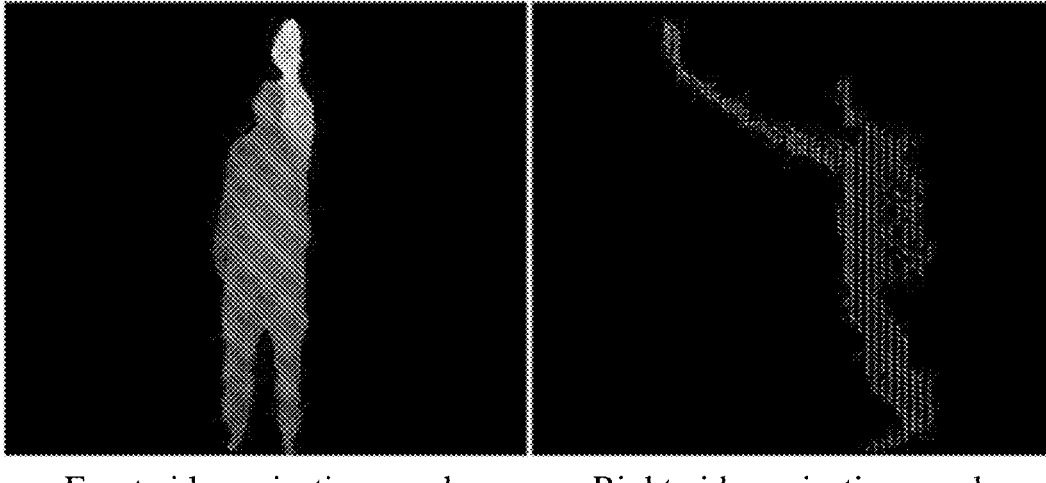
Front-side projection graph          Right-side projection graph
FIG. 5A          FIG. 5B
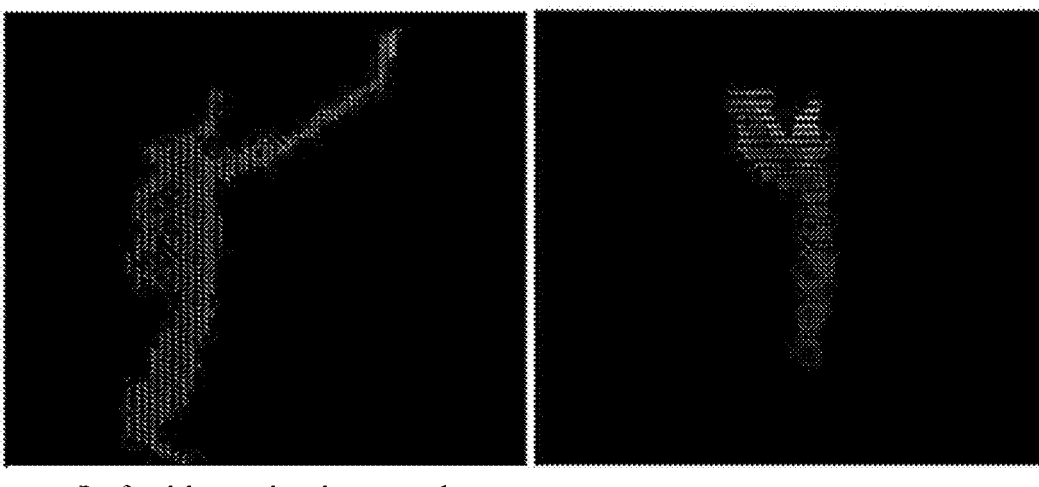
Left-side projection graph          Top-side projection graph
FIG. 5C          FIG. 5D

DEEP VIDEO LINKAGE FEATURE-BASED BEHAVIOR RECOGNITION METHOD

TECHNICAL FIELD

The present invention relates to the field of computer vision technologies, in particular to a depth video linkage feature-based behavior recognition method.

BACKGROUND

Behavior recognition, which is now a research hotspot in the field of computer vision, is widely used in the fields of video surveillance, behavior analysis and the like.

With the development of depth cameras, depth videos, including a great deal of motion information, are readily accessible to people. Some scholars acquire locations of human bone joints in a depth video and use data of the joints for recognition. Other scholars directly input the depth video into a network for behavior recognition. However, the bone joint-based behavior recognition is susceptible to not only the accuracy in acquiring the bone joints but also intra-class differences of behaviors and the occlusion of the bone joints. Directly inputting the depth video into the network fails to make full use of three-dimensional information contained in the depth video and a feature relationship between behaviors in different dimensions.

Therefore, a depth video linkage feature-based behavior recognition method is provided to solve the problems of the behavior recognition algorithms described above.

SUMMARY

The present invention is provided to solve the problems in the prior art, and its objective is to provide a depth video linkage feature-based behavior recognition method, so as to solve the problem that deep features extracted by an existing recognition method fail to make full use of three-dimensional information in a depth behavior video.

The depth video linkage feature-based behavior recognition method includes the following steps:

1) projecting a depth video of each behavior sample onto a front side, a right side, a left side and a top side to obtain corresponding projection sequences;

2) obtaining a dynamic image of each behavior sample by calculating a dynamic image of each projection sequence;

3) inputting the dynamic image of each behavior sample into a respective feature extraction module and extracting features;

4) inputting the extracted features into a multi-projection linkage feature extraction module and extracting a linkage feature of each projection combination;

5) connecting the extracted linkage features of all projection combinations by channel, and inputting the connected features into an average pooling layer and a fully connected layer;

6) constructing a depth video linkage feature-based behavior recognition network;

7) inputting a depth video of each training behavior sample into the depth video linkage feature-based behavior recognition network, and training the network till convergence; and 8) inputting a depth video of each behavior sample to be tested into the trained depth video linkage feature-based behavior recognition network to implement behavior recognition.

Preferably, the projection sequence is obtained in step 1) as follows:

acquiring a depth video of any behavior sample, each behavior sample consisting of all frames in the depth video of the behavior sample $$V = \{I_t | t \in [1, N]\},$$

in which t represents a time index, and N is a total quantity of frames of the depth video V of the behavior sample. $I_t \in \mathbb{R}^{R \times C}$ is a matrix representation of a $t^{th}$-frame depth image of the depth video V of the behavior sample, in which R and C correspond to the quantity of rows and the quantity of columns of the matrix representation of the $t^{th}$-frame depth image respectively, and indicates that a matrix is a real matrix. $I_t(x_i, y_i) = d_i$ represents a depth value of a point $p_i$ with coordinates $(x_i, y_i)$ on the $t^{th}$-frame depth image, i.e., a distance between the point $p_i$ and a depth camera. $d_i \in [0,D]$ in which D represents the furthest distance detectable by the depth camera.

The depth video V of the behavior sample can be expressed as a set of projection sequences, which is denoted by a formula:

$$V = \{V_{front}, V_{right}, V_{left}, V_{top}\},$$

in which $V_{front}$ represents a projection sequence obtained by projecting the depth video V of the behavior sample onto a front side, $V_{right}$ represents a projection sequence obtained by projecting the depth video V of the behavior sample onto a right side, $V_{left}$ represents a projection sequence obtained by projecting the depth video V of the behavior sample onto a left side, and the $V_{top}$ represents a projection sequence obtained by projecting the depth video V of the behavior sample onto a top side.

The projection sequence $V_{front}$ is acquired as follows:

$$V_{front} = \{F_t | t \in [1, N]\}, \text{ in which } F_t \in \mathbb{R}^{R \times C}$$

represents a projection graph obtained by projecting the $t^{th}$-frame depth image of the depth video V of the behavior sample onto a front side. An abscissa value $x_i$, an ordinate value $y_i$ and a depth value $d_i$ of the point $p_i$ in the depth image respectively determine an abscissa value $$x_i^f,$$

an ordinate value $$y_i^f$$

and a pixel value $$z_i^f$$

of a point projected from the point $p_i$ onto the projection graph $F_t$, which are denoted by formulas:

$$F_t\left(x_i^f, y_i^f\right) = z_i^f,$$

$$x_i^f = x_i, y_i^f = y_i, z_i^f = f_1(d_i),$$

in which $f_t$ is a linear function indicating that the depth value $d_i$ is mapped to an interval [0,255], such that the smaller the depth value of a point is, the larger the pixel value of the point on the projection graph is, i.e., the closer the point is to the depth camera, the brighter the point is on a front-side projection graph.

The projection sequence $V_{right}$ is acquired as follows:

$$V_{right} = \{R_t | t \in [1, N]\}, \text{ in which } R_t \in \mathbb{R}^{R \times D}$$

represents a projection graph obtained by projecting the $t^{th}$-frame depth image on a right side. At least one point is projected onto the same location on the projection graph when the depth image is projected onto the right side. A point closest to an observer, i.e., a point furthest from a projection plane, can be seen when a behavior is observed from the right side. An abscissa value of the point, furthest from the projection plane, on the depth image is reserved, and a pixel value of the point in this location of the projection graph is calculated according to the abscissa value. Points in the depth image are traversed column by column from a column with the smallest abscissa x on the depth image in a direction in which x increases, and are projected onto the projection graph. An abscissa value $x_i$, an ordinate value $y_i$ and a depth value $d_i$ of the point $p_i$ in the depth image respectively determine a pixel value $$z_i^r,$$

an ordinate value $$y_i^r$$

and an abscissa value $$x_i^r$$

of a point in a projection graph $R_t$, which are denoted by formulas:

$$R_t(x_i^r, y_i^r) = z_i^r,$$

$$x_i^r = d_i, y_i^r = y_i, z_i^r = f_2(x_i),$$

in which $f_2$ is a linear function indicating that the abscissa value $x_i$ is mapped to an interval [0,255]. In a case that x continues to increase, a new point is reserved if the new point and the previously projected point are projected onto the same location in the projection graph, i.e., a pixel value of this location in the projection graph is calculated by using the abscissa value of the point with the largest abscissa value, i.e., $$z_i^r = f_2(x_m),$$

in which $x_m = \max x_i$, $x_i \in X_R$, $X_R$ is a set of abscissas of all points with ordinate values $$y_i^r$$

and depth values $$x_i^r$$

in the depth image, and $\max x_i$, $x_i \in X_R$ represents a maximum abscissa value in the set $X_R$.

The projection sequence $V_{left}$ is acquired as follows:

$$V_{left} = \{L_t | t \in [1, N]\}, \text{ in which } L_t \in \mathbb{R}^{R \times D}$$

represents a projection graph obtained by projecting the $t^{th}$-frame depth image onto a left side. In a case that multiple points are projected onto the same location on a left-side projection graph, a point furthest from the projection plane is reserved. Points in the depth image are traversed column by column from a column with the largest abscissa x on the depth image in a direction in which x decreases, and are projected onto the left-side projection graph. An abscissa value $x_i$, an ordinate value $y_i$ and a depth value $d_i$ of the point $p_i$ in the depth image respectively determine a pixel value $$z_i^l,$$

an ordinate value $$y_i^l$$

and an abscissa value $$x_i^l$$

of a point in the projection graph $L_t$. For a point projected onto the same coordinates $$\left(x_i^l, y_i^l\right)$$

on the left-side projection graph, an abscissa value of the point with the smallest abscissa is selected to calculate a pixel value at the coordinates of the projection graph, which are denoted by formulas:

$$L_t\left(x_i^l, y_i^l\right) = z_i^l,$$

$$x_i^l = d_i, y_i^l = y_i, z_i^l = f_3(x_n),$$

in which $f_3$ is a linear function indicating that an abscissa value $x_n$ is mapped to an interval [0,255]. $x_n$=min $x_i$, $x_i \in X_L$, in which $X_L$ is a set of abscissas of all points with ordinate values $$y_i^l$$

and depth values $$x_i^l$$

in the depth image, and min $x_i$, $x_i \in X_L$ represents a minimum abscissa value in the set $X_L$.

The projection sequence $V_{top}$ is acquired as follows:

$$V_{top} = \{T_t | t \in [1, N]\}, \text{ in which } O_t \in \mathbf{R}^{D \times C}$$

represents a projection graph obtained by projecting the $t^{th}$-frame depth image onto a top side. In a case that multiple points are projected onto the same location on a top-side projection graph, a point furthest from the projection plane is reserved. Points in the depth image are traversed column by column from a column with the smallest ordinate y on the depth image in a direction in which y increases, and are projected onto the top-side projection graph. An abscissa value $x_i$, an ordinate value $y_i$ and a depth value $d_i$ of the point $p_i$ in the depth image respectively determine an abscissa value $$x_i^o,$$

a pixel value $$z_i^o$$

and an ordinate value $$y_i^o$$

of a point projected from the point $p_i$ onto the projection graph $O_t$. For a point projected onto the same coordinates $$(x_i^o, y_i^o)$$

on the projection graph, an ordinate value of the point with the largest ordinate is selected to calculate a pixel value at the coordinates of the projection graph, which is denoted by formulas:

$$O_t(x_i^o, y_i^o) = z_i^o, x_i^o = x_i, y_i^o = d_i, z_i^o = f_4(y_q),$$

in which $f_4$ is a linear function indicating that an ordinate value $y_q$ is mapped to an interval [0,255]. $y_q$=max $y_i$, $y_i \in Y_O$, in which $Y_O$ is a set of ordinates of all points with abscissa values $$x_i^o$$

and depth values $$y_i^o$$

in the depth image, and max $y_i$, $y_i \in Y_O$ represents a maximum ordinate value in the set $Y_O$.

Preferably, the dynamic image is calculated in step 2) as follows:

by taking a front-side projection sequence $V_{front}=\{F_t | t \in [1,N]\}$ of the depth video V of the behavior sample as an example, vectorizing $F_t$ first, i.e., connecting a row vector of $F_t$ into a new row vector $i_t$;

solving an arithmetic square root of each element in the row vector $i_t$ to obtain a new vector $w_t$, i.e.:

$$W_t = \sqrt{i_t},$$

in which $\sqrt{i_t}$ indicates to solve an arithmetic square root of each element in the row vector $i_t$, and $w_t$ is denoted by a frame vector of a $t^{th}$-frame image of the front-side projection sequence $V_{front}$ of the depth video V of the behavior sample;

calculating a feature vector $v_t$ of the $t^{th}$-frame image of the front-side projection sequence $V_{front}$ of the depth video V of the behavior sample according to a formula:

$$v_t = \frac{1}{t}\sum_{\kappa=1}^{t} w_\kappa,$$

in which $$\sum_{\kappa=1}^{t} w_\kappa$$

represents summation of frame vectors from a first-frame image to the $t^{th}$-frame image of the front-side projection sequence $V_{front}$ of the depth video V of the behavior sample;

calculating a score $B_t$ of the $t^{th}$-frame image $F_t$ of the front-side projection sequence $V_{front}$ of the depth video V of the behavior sample according to a formula:

$$B_t = u^T \cdot v_t,$$

in which u is a vector of a dimension A, A=R×C, $u^T$ represents transposition of the vector u, and $u^T \cdot v_t$ indicates to calculate a dot product of the feature vector $v_t$ and a vector obtained by transposing the vector u;

calculating a value of u, such that frame images in the front-side projection sequence $V_{front}$ have higher and higher scores from front to back, i.e., the larger the t is, the higher the score $B_t$ is, u being calculated by using RankSVM as follows:

$$u = \arg\min_u E(u),$$

$$E(u) = \frac{\lambda}{2}\|u\|^2 + \frac{2}{T(T-1)} \times \sum_{c>j}\max\{0, 1 - B_c + B_j\},$$

in which $$\arg\min_u E(u)$$

represents u that minimizes the value of $E(u)$, $\lambda$ is a constant, and $\|u\|^2$ indicates to calculate a sum of squares of each element in the vector u; $B_c$ and $B_j$ respectively represent a score of a $c^{th}$-frame image and a score of a $j^{th}$-frame image of the front-side projection sequence V front of the depth video of the behavior sample, and $\max\{0,1-B_c+B_j\}$ indicates to choose a larger value of 0 and $1-B_c+B_j$; and in response to calculating the vector u by using RankSVM, arranging the vector u in an image form with the same size as $F_t$ to obtain $u' \in \mathbb{R}^{R \times C}$, u' being a dynamic image of the front-side projection sequence $V_{front}$ of the depth video V of the behavior sample.

Preferably, the feature extraction module includes a convolution unit 1, a convolution unit 2, a convolution unit 3, a convolution unit 4, a convolution unit 5 and a multi-feature fusion unit, wherein outputs of the convolution unit 1, the convolution unit 2, the convolution unit 3, the convolution unit 4 and the convolution unit 5 are sequentially inputted into the multi-feature fusion unit, and a final output of the multi-feature fusion unit is $M_6$.

The convolution unit 1 includes two convolution layers and one maximum pooling layer. Each convolution layer has 64 convolution kernels, and each convolution kernel has a size of 3×3 A pooling kernel of the maximum pooling layer has a size of 2×2. An output of the convolution unit 1 is $C_1$.

The convolution unit 2 includes two convolution layers and one maximum pooling layer. Each convolution layer has 128 convolution kernels, and each convolution kernel has a size of 3×3. A pooling kernel of the maximum pooling layer has a size of 2×2. An input of the convolution unit 2 is $C_1$ and an output thereof is $C_2$.

The convolution unit 3 includes three convolution layers and one maximum pooling layer. Each convolution layer has 256 convolution kernels, and each convolution kernel has a size of 3×3. A pooling kernel of the maximum pooling layer has a size of 2×2. An input of the convolution unit 3 is $C_2$ and an output thereof is $C_3$.

The convolution unit 4 includes three convolution layers and one maximum pooling layer. Each convolution layer has 512 convolution kernels, and each convolution kernel has a size of 3×3. A pooling kernel of the maximum pooling layer has a size of 2×2. An input of the convolution unit 4 is $C_3$ and an output thereof is $C_4$.

The convolution unit 5 includes three convolution layers and one maximum pooling layer. Each convolution layer has 512 convolution kernels, and each convolution kernel has a size of 3×3. A pooling kernel of the maximum pooling layer has a size of 2×2. An input of the convolution unit 5 is $C_4$ and an output thereof is $C_5$.

Inputs of the multi-feature fusion unit are the output $C_1$ of the convolution unit 1, the output of the convolution unit 2, the output $C_3$ of the convolution unit 3, the output $C_4$ of the $C_2$ convolution unit 4 and the output $C_5$ of the convolution unit 5. The output $C_1$ of the convolution unit 1 is inputted into a maximum pooling layer 1 and a convolution layer 1 in the multi-feature fusion unit. A pooling kernel of the maximum pooling layer 1 has a size of 4×4. The convolution layer 1 has 512 convolution kernels, each convolution kernel has a size of 1×1, and an output of the convolution layer 1 is $M_1$.

The output $C_2$ of the convolution unit 2 is inputted into a maximum pooling layer 2 and a convolution layer 2 in the multi-feature fusion unit. A pooling kernel of the maximum pooling layer 2 has a size of 2×2. The convolution layer 2 has 512 convolution kernels, each convolution kernel has a size of 1×1, and an output of the convolution layer 2 is $M_2$.

The output $C_3$ of the convolution unit 3 is inputted into a convolution layer 3 in the multi-feature fusion unit. The convolution layer 3 has 512 convolution kernels, each convolution kernel has a size of 1×1, and an output of the convolution layer 3 is $M_3$.

The output $C_4$ of the convolution unit 4 is inputted into an up-sampling layer 1 and a convolution layer 4 in the multi-feature fusion unit. The convolution layer 4 has 512 convolution kernels, the convolution kernel has a size of 1×1, and an output of the convolution layer 4 is $M_4$.

The output $C_5$ of the convolution unit 5 is inputted into an up-sampling layer 2 and a convolution layer 5 in the multi-feature fusion unit. The convolution layer 5 has 512 convolution kernels, each convolution kernel 5 has a size of 1×1, and an output of the convolution layer 5 is Ms. The output $M_1$ of the convolution layer 1, the output $M_2$ of the convolution layer 2, the output $M_3$ of the convolution layer 3, the output $M_4$ of the convolution layer 4 and the output $M_5$ of the convolution layer 5 are connected by channel and inputted into a convolution layer 6. The convolution layer 6 has 256 convolution kernels, each convolution kernel has a size of 1×1, and an output of the convolution layer 6 is $M_6$. An output of the multi-feature fusion unit is the output $M_6$ of the convolution layer 6.

Dynamic images of the front-side projection sequence, the right-side projection sequence, the left-side projection sequence and the top-side projection sequence of the depth video V of the behavior sample are respectively inputted into respective feature extraction modules, namely, a front-side projection feature extraction module, a right-side projection feature extraction module, a left-side projection feature extraction module and a top-side projection feature extraction module. During network training, the modules described above do not share parameters. The feature extraction modules described above respectively output features $Q^f$, $Q^r$, $Q^l$ and $Q^t$.

$Q^f$ represents a feature that is extracted when the dynamic image of the front-side projection sequence of the depth video V of the behavior sample is inputted into the front-side projection feature extraction module; $Q^r$ represents a feature that is extracted when the dynamic image of the right-side projection sequence of the depth video v of the behavior sample is inputted into the right-side projection feature extraction module; $Q^l$ represents a feature that is extracted when the dynamic image of the left-side projection sequence of the depth video V of the behavior sample is inputted into the left-side projection feature extraction module; and $Q^t$ represents a feature that is extracted when the dynamic image of the top-side projection sequence of the depth video V of the behavior sample is inputted into the top-side projection feature extraction module.

Preferably, a linkage feature is extracted in step 4) by combining every two, every three and every four of the features extracted by all the feature extraction modules in step 3) to obtain multiple projection combinations.

The linkage feature of each projection combination is calculated as follows:

connecting the features in the projection combination by channel to obtain a combined feature $Q \in \mathbb{R}^{H \times W \times \gamma J}$, in which H and W represent a height and a width of each feature in the projection combination respectively, J represents the quantity of channels of each feature in the projection combination, and $\gamma$ represents the quantity of features in the projection combination; calculating an explicit linkage feature $Z_\alpha$ of each projection combination and an implicit linkage feature $Z_\beta$ of each projection combination; and calculating a linkage feature Z of the projection combination according to a formula:

$$Z = Z_\alpha \oplus Z_\beta,$$

in which $\oplus$ represents addition of elements in corresponding locations of matrices $Z_\alpha$ and $Z_\beta$.

Preferably, in step 5), the linkage features of all the projection combinations are connected by channel, and inputted into the average pooling layer. An output $\Gamma$ of the average pooling layer is inputted into a fully connected layer 2. The quantity of neurons in the fully connected layer 2 is $D_2$. An output $S_2$ of the fully connected layer 2 is calculated as follows:

$$S_2 = \phi_{relu}(W_2 \cdot \Gamma + \theta_2),$$

in which $\phi_{relu}$ is an activation function relu, $W_2$ is a weight of the fully connected layer 2, and $\theta_2$ is a bias vector of the fully connected layer 2.

The output $S_2$ of the fully connected layer 2 is inputted into a fully connected layer 3 with an activation function softmax. The quantity of neurons in the fully connected layer 3 is K. An output $S_3$ is calculated as follows:

$$S_3 = \phi_{softmax}(W_3 \cdot S_2 + \theta_3),$$

in which $\phi_{softmax}$ represents the activation function softmax, $W_3$ is a weight of the fully connected layer 3, and $\theta_3$ is a bias vector of the fully connected layer 3.

Preferably, an input of the depth video linkage feature-based behavior recognition network in step 6) is the depth video of the behavior sample, and an output thereof is a probability that a corresponding behavior sample belongs to a respective behavior category, i.e., an output of the fully connected layer 3 is $Q_3$. A loss function L of the network is:

$$L = -\sum_{g=1}^{G} \sum_{p=1}^{K} [1_g]_p \log([Q_3^g]_p),$$

in which G is a total quantity of training behavior samples, K is the quantity of categories of the behavior samples, $$Q_3^g$$

is a network output of a $g^{th}$ behavior sample, and $1_g$ is an expected output of the $g^{th}$ behavior sample, $p^{th}$-dimension data of $1_g$ is defined as:

$$[1_g]_p = \begin{cases} 1, & \text{if } p = l_g \\ 0, & \text{else} \end{cases},$$

in which $l_g$ is a tag value of the $g^{th}$ behavior sample.

Preferably, the behavior recognition in step 8) includes: inputting a depth video of each tested behavior sample into the trained depth video linkage feature-based behavior recognition network to obtain a predicted probability value of a current tested behavior video sample belonging to each behavior category, and taking the behavior category with the largest probability value as the finally predicted behavior category to which the current tested behavior video sample belongs, so as to implement the behavior recognition.

Preferably, the explicit linkage feature of each projection combination is calculated by the following steps:

1) calculating an average value of features of each channel and an average value $$\bar{Q}_a$$

of features of an $a^{th}$ channel of the combined feature Q according to a formula:

$$\bar{Q}_a = \frac{1}{H \times W} \sum_{h,w}^{H,W} Q_{a,h,w},$$

in which $Q_{a,h,w}$ represents an $h^{th}$-row and $w^{th}$-column element value of the $a^{th}$ channel of the combined feature 2;

2) calculating a degree of explicit correlation $P \in \mathbb{R}^{\gamma J \times \gamma J}$ of features between different channels of the combined feature Q, a degree of explicit correlation $p^{a,b}$ of features between the $a^{th}$ channel and a $b^{th}$ channel being calculated according to a formula:

$$P^{a,b} = \frac{1}{H \times W} \sum_{h,w}^{H,W} (Q_{a,h,w} - \bar{Q}_a)(Q_{b,h,w} - \bar{Q}_b),$$

in which $Q_{b,h,w}$ represents an $h^{th}$-row and $w^{th}$-column element value of the $b^{th}$ channel of the combined feature Q, and $$\bar{Q}_b$$

represents an average value of features of the $b^{th}$ channel of the combined feature Q;

3) calculating a degree of normalized explicit correlation $$\hat{P} \in \mathbb{R}^{\gamma J \times \gamma J}$$

of features between the different channels of the combined feature Q, a degree of normalized explicit correlation $$\hat{P}^{a,b}$$

of features between the $a^{th}$ channel and the $b^{th}$ channel being calculated according to a formula:

$$\hat{P}^{a,b} = \frac{e^{P^{a,b}}}{\sum\limits_{b=1}^{\gamma J} e^{P^{a,b}}};$$

and 4) calculating an explicit linkage feature $$Z_\alpha \in \mathbb{R}^{H \times W \times \gamma J}$$

of the projection combination, a feature $$Z_\alpha^a$$

of the $a^{th}$ channel of $Z_\alpha$ being calculated according to a formula:

$$Z_\alpha^a = \sum_{b=1}^{\gamma J} \hat{P}^{a,b} Q_b,$$

in which $Q_b$ represents a feature of the $b^{th}$ channel of the combined feature Q.

Preferably, the implicit linkage feature of each projection combination is calculated by the following steps:

1) calculating an average value of each channel of the combined feature Q, and connecting the average values of all the channels into a vector $$\bar{Q} = (\bar{Q}_1, \bar{Q}_2, \dots, \bar{Q}_{\gamma J});$$

2) inputting the vector $\bar{Q}$ into the fully connected layer 1, the quantity of neurons of the fully connected layer 1 being γJ, an output of the fully connected layer 1 being $$S_1 = \phi_{sigmoid}(W_1 \cdot \bar{Q} + \theta_1) \in \mathbb{R}^{\gamma J \times 1},$$

in which $\phi_{sigmoid}$ represents an activation function sigmoid, $$W_1 \in \mathbb{R}^{\gamma J \times \gamma J}$$

represents a weight of the fully connected layer 1, and $$\theta_1 \in \mathbb{R}^{\gamma J \times 1}$$

represents a bias vector of the fully connected layer 1; and 3) calculating an implicit linkage feature $$Z_\beta \in \mathbb{R}^{H \times W \times \gamma J}$$

of the projection combination, a feature $$Z_\beta^a$$

of an $a^{th}$ channel of $Z_\beta$ being calculated according to a formula:

$$Z_\beta^a = S_1^a \cdot Q_a,$$

in which $$S_1^a$$

represents a value of an $a^{th}$ element of the output $S_1$ of the fully connected layer 1.

The present invention has the following beneficial effects: 1) the depth video-based behavior recognition cannot acquire information such as human appearance, thereby protecting human privacy; meanwhile, the depth video is less susceptible to light, and thus can provide more abundant three-dimensional information about a behavior; and 2) information of the behavior in different dimensions can be acquired by projecting the depth video onto different planes, and these pieces of information can be combined to make it easier to recognize a human behavior; and the learned linkage features of the depth video in different dimensions are more discriminative for behavior recognition.

BRIEF DESCRIPTION OF THE DRAWINGS

FIGS. 5A-5D are schematic diagrams of planar projections of a hand waving behavior according to an embodiment; and

13

Figure 6:
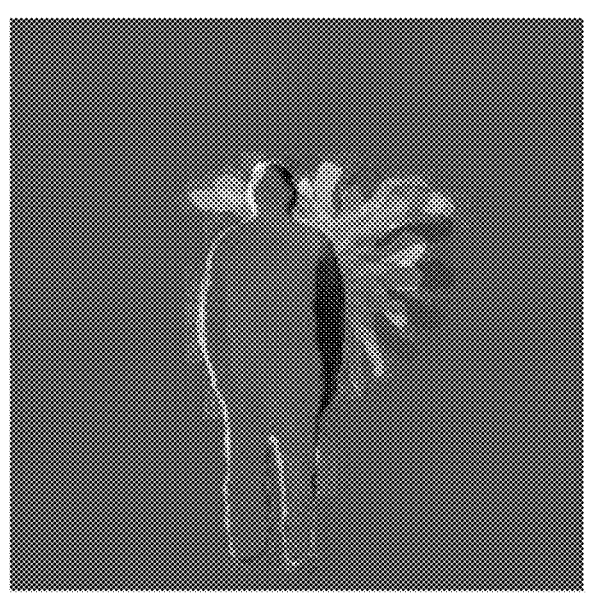

FIG. 6 is a dynamic image of a front-side projection of a hand waving behavior according to an embodiment.

DETAILED DESCRIPTION

The technical solutions in the embodiments of the present invention will be described clearly and completely with reference to the accompanying drawings in the embodiments of the present invention. Obviously, the described embodiments are only part of embodiments of the present invention, rather than all of the embodiments. According to the described embodiments of the present invention, all other embodiments obtained by those of ordinary skill in the art without any creative work fall within the protection scope of the present invention.

According to the embodiments of the present invention, referring to FIGS. 1-6, a depth video linkage feature-based behavior recognition method includes the following steps:

1) projecting a depth video of each behavior sample onto a front side, a right side, a left side and a top side to obtain four projection sequences;

2) obtaining four dynamic images of each behavior sample by calculating dynamic images of the four projection sequences of each behavior sample;

3) inputting the four dynamic images into respective feature extraction modules and extracting features;

4) inputting the features extracted from the dynamic images of the four projection sequences into a multi-projection linkage feature extraction module and extracting a linkage feature of each projection combination;

5) connecting the extracted linkage features of all the projection combinations by channel, and inputting the connected features into an average pooling layer and two fully connected layers;

6) constructing a depth video linkage feature-based behavior recognition network;

7) inputting a depth video of each training behavior sample into the depth video linkage feature-based behavior recognition network, and training the network till convergence; and 8) inputting a depth video of each tested behavior sample into the trained depth video linkage feature-based behavior recognition network to implement behavior recognition.

The dynamic image is obtained in step 2) as follows.

By taking a front-side projection sequence $$V_{front} = \{F_t | t \in [1, N]\}$$

of a depth video V of the behavior sample as an example, the dynamic image is calculated as follows:

vectorizing $F_t$ first, i.e., connecting a row vector of $F_t$ into a new row vector $i_t$;

solving an arithmetic square root of each element in the row vector $i_t$ to obtain a new vector $w_t$, i.e.:

$$w_t = \sqrt{i_t},$$

in which $$\sqrt{i_t}$$

14 indicates to solve an arithmetic square root of each element in the row vector $i_t$, $w_t$ being denoted by a frame vector of a $t^{th}$-frame image of the front-side V projection sequence $V_{front}$ of the depth video V of the behavior sample;

calculating a feature vector $v_t$ of the $t^{th}$-frame image of the front-side projection sequence $V_{front}$ of the depth video V of the behavior sample according to a formula:

$$v_t = \frac{1}{t} \sum_{\kappa=1}^{t} w_\kappa,$$

in which $$\sum_{\kappa=1}^{t} w_\kappa$$

represents summation of frame vectors from a first-frame image to the $t^{th}$-frame image of the front-side projection sequence $V_{front}$ of the depth video V of the behavior sample;

calculating a score $B_t$ of the $t^{th}$-frame image $F_t$ of the front-side projection sequence $V_{front}$ of the depth video V of the behavior sample according to a formula:

$$B_t = u^T \cdot v_t,$$

in which u is a vector in a dimension A, $$A = R \times C,$$

$u^T$ represents transposition of the vector u, and $u^T \cdot v_t$ indicates to calculate a dot product of the feature vector $v_t$ and a vector obtained by transposing the vector u;

calculating a value of u, such that frame images in the front-side projection sequence $V_{front}$ have higher and higher scores from front to back, i.e., the larger the t is, the higher the score $B_t$ is, u being calculated by using RankSVM as follows:

$$u = \underset{u}{\arg\min} E(u),$$

$$E(u) = \frac{\lambda}{2} \|u\|^2 + \frac{2}{T(T-1)} \times \sum_{c>j} \max\{0, 1 - B_c + B_j\},$$

in which $$\underset{u}{\arg\min} E(u)$$

represents u that minimizes the value of E(u), $\lambda$ is a constant, and $\|u\|^2$ indicates to calculate a sum of squares of all elements in the vector u; $B_c$ and $B_j$ respectively represent a score of a $c^{th}$-frame image and a score of a $j^{th}$-frame image of the front-side projection sequence $V_{front}$ of the depth video V of the behavior sample, and $\max\{0, 1 - B_c + B_j\}$ indicates to choose a larger value of 0 and $1 - B_c + B_j$; and in response to calculating the vector u by using RankSVM, arranging the vector u in an image form with the same size as $F_t$ to obtain $$u' \in \mathbb{R}^{R \times C},$$

u' being the dynamic image of the front-side projection sequence $V_{front}$ of the depth video V of the behavior sample.

The dynamic images of a right-side projection sequence, a left-side projection sequence and a top-side projection sequence of the depth video V of the behavior sample are calculated in the same way as the dynamic image of the front-side projection sequence.

A linkage feature of each projection combination is extracted in step 4) as follows.

Figure 1:
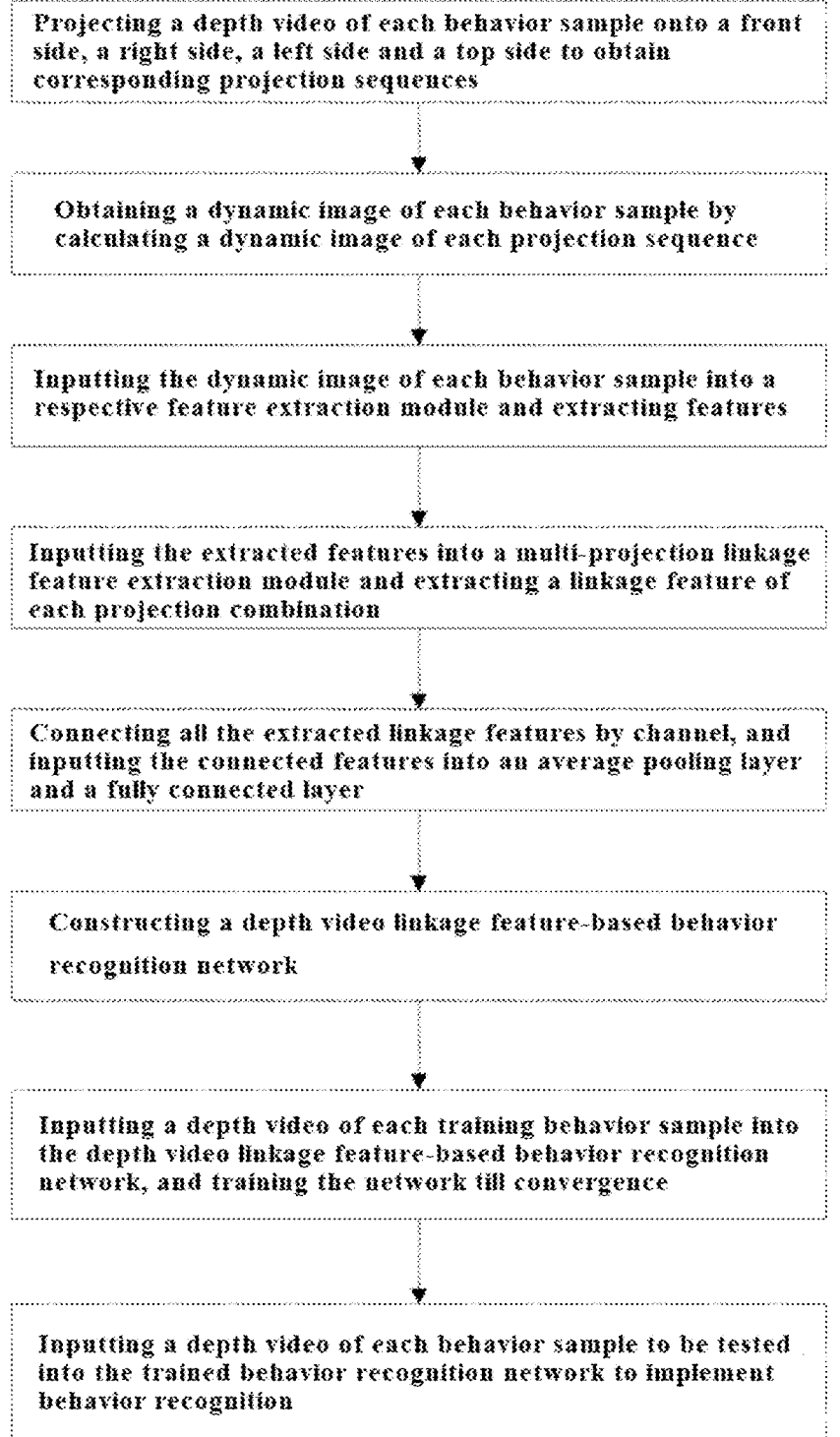
FIG. 1 is a flow chart according to the present invention.
Figure 2:
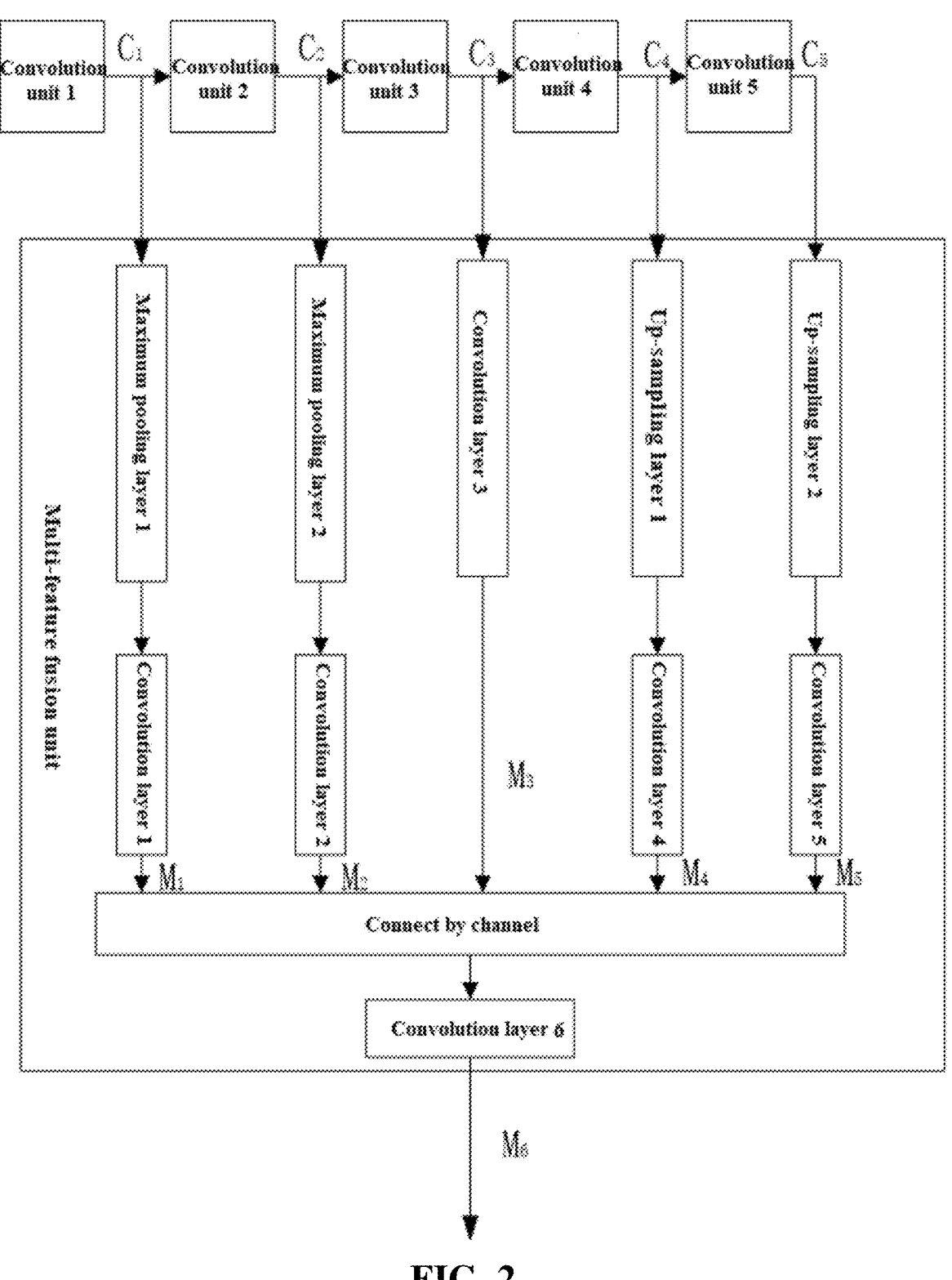
FIG. 2 is a flow chart of a feature extraction module.
Figure 3:
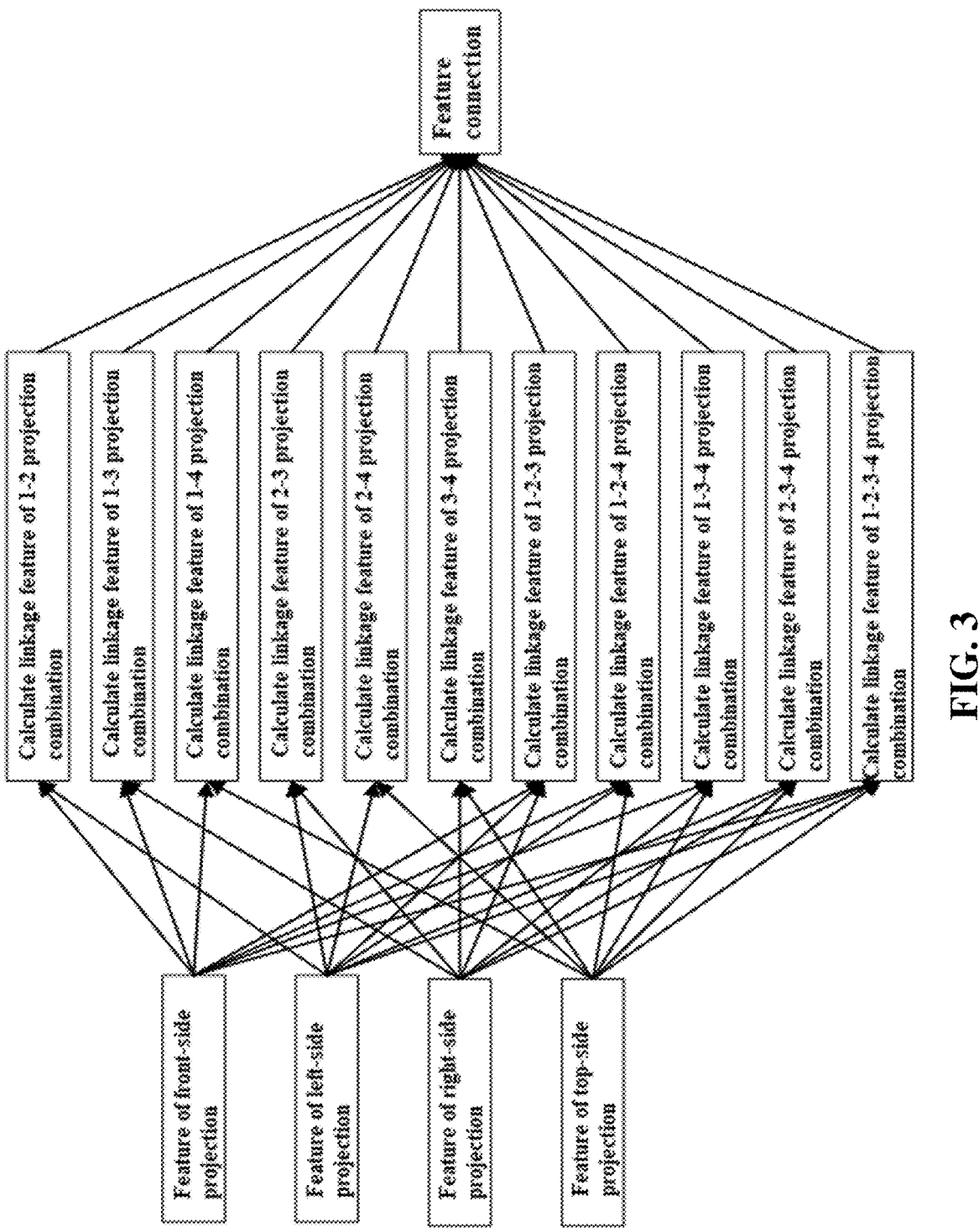
FIG. 3 is a flow chart illustrating extraction of linkage features from each projection combination.

As shown in FIG. 3, every two, every three and every four of the features extracted after the dynamic images of the four projection sequences are inputted into the respective feature extraction modules are combined to obtain a total of 11 projection combinations. A combination of the features extracted from the dynamic images of the front-side projection sequence and of the left-side projection sequence is denoted by a 1-2 projection combination. A combination of the features extracted from the dynamic images of the front-side projection sequence and of the right-side projection sequence is denoted by a 1-3 projection combination. A combination of the features extracted from the dynamic images of the front-side projection sequence and of the top-side projection sequence is denoted by a 1-4 projection combination. A combination of the features extracted from the dynamic images of the left-side projection sequence and of the right-side projection sequence is denoted by a 2-3 projection combination. A combination of the features extracted from the dynamic images of the left-side projection sequence and of the top-side projection sequence is denoted by a 2-4 projection combination. A combination of the features extracted from the dynamic images of the right-side projection sequence and of the top-side projection sequence is denoted by a 3-4 projection combination. A combination of the features extracted from the dynamic images of the front-side projection sequence, of the left-side projection sequence and of the right-side projection sequence is denoted by a 1-2-3 projection combination. A combination of the features extracted from the dynamic images of the front-side projection sequence, of the left-side projection sequence and of the top-side projection sequence is denoted by a 1-2-4 projection combination. A combination of the features extracted from the dynamic images of the front-side projection sequence, of the right-side projection sequence and of the top-side projection sequence is denoted by a 1-3-4 projection combination. A combination of the features extracted from the dynamic images of the left-side projection sequence, of the right-side projection sequence and of the top-side projection sequence is denoted by a 2-3-4 projection combination. A combination of the features extracted from the dynamic images of the front-side projection sequence, of the left-side projection sequence, of the right-side projection sequence and of the top-side projection sequence is denoted by a 1-2-3-4 projection combination.

The linkage feature of each projection combination is calculated as follows:

connecting the features in the projection combination by channel to obtain a combined feature $$Q \in \mathbb{R}^{H \times W \times \gamma J},$$

in which H and W represent a height and a width of each feature in the projection combination respectively, J represents the quantity of channels of each feature in the projection combination, and $\gamma$ represents the quantity of features in the projection combination.

An explicit linkage feature of each projection combination is calculated first by the following steps:

1) calculating an average value of features of each channel and an average value $\bar{Q}_a$ of features of an $a^{th}$ channel of the combined feature Q according to a formula:

$$\bar{Q}_a = \frac{1}{H \times W} \sum_{h,w}^{H,W} Q_{a,h,w},$$

in which $Q_{a,h,w}$ represents an $h^{th}$-row and $w^{th}$-column element value of the $a^{th}$ channel of the combined feature Q;

2) calculating a degree of explicit correlation $$P \in \mathbb{R}^{\gamma J \times \gamma J}$$

of features between different channels of the combined feature Q, a degree of explicit correlation $p^{a,b}$ of features between the $a^{th}$ channel and a $b^{th}$ channel being calculated according to a formula:

$$P^{a,b} = \frac{1}{H \times W} \sum_{h,w}^{H,W} (Q_{a,h,w} - \bar{Q}_a)(Q_{b,h,w} - \bar{Q}_b),$$

in which $Q_{b,h,w}$ represents an $h^{th}$-row and $w^{th}$-column element value of the $b^{th}$ channel of the combined feature Q, and $$\bar{Q}_b$$

represents an average value of features of the $b^{th}$ channel of the combined feature Q;

3) calculating a degree of normalized explicit correlation $$\hat{P} \in R^{\gamma J \times \gamma J}$$

of features between the different channels of the combined feature Q, a degree of normalized explicit correlation $$\hat{P}^{a,b}$$

of features between the $a^{th}$ channel and the $b^{th}$ channel being calculated according to a formula:

$$\hat{P}^{a,b} = \frac{e^{P^{a,b}}}{\sum_{b=1}^{\gamma J} e^{P^{a,b}}}; \text{ and}$$

4) calculating an explicit linkage feature $$Z_\alpha \in \mathbb{R}^{H \times W \times \gamma J}$$

of the projection combination, a feature $$Z_\alpha^a$$

of the $a^{th}$ channel of $Z_\alpha$ being calculated according to a formula:

$$Z_\alpha^a = \sum_{b=1}^{\gamma J} \hat{P}^{a,b} Q_b,$$

in which $Q_b$ represents a feature of the $b^{th}$ channel of the combined feature Q.

After that, an implicit linkage feature of each projection combination is calculated by the following steps:

1) calculating an average value of each channel of the combined feature Q, and connecting the average values of all the channels into a vector $$\bar{Q} = (\bar{Q}_1, \bar{Q}_2, \ldots, \bar{Q}_{\gamma J});$$

2) inputting the vector $\bar{Q}$ into a fully connected layer 1, the quantity of neurons of the fully connected layer 1 being $\gamma J$, an output of the fully connected layer 1 being $$S_1 = \phi_{sigmoid}(W_1 \cdot \bar{Q} + \theta_1) \in \mathbb{R}^{\gamma J \times 1},$$

in which $\phi_{sigmoid}$ represents an activation function sigmoid, $$W_1 \in \mathbb{R}^{\gamma J \times \gamma J}$$

represents a weight of the fully connected layer 1, and $\theta_1 \in \mathbb{R}^{\gamma J \times 1}$ represents a bias vector of the fully connected layer 1; and 3) calculating an implicit linkage feature $$Z_\beta \in \mathbb{R}^{H \times W \times \gamma J}$$

of the projection combination, a feature $$Z_\beta^a$$

of an $a^{th}$ channel of $Z_\beta$ being calculated according to a formula:

$$Z_\beta^a = S_1^a \cdot Q_a,$$

in which $$S_1^a$$

represents a value of an $a^{th}$ element of the output $S_1$ of the fully connected layer 1.

Finally, the linkage feature Z of each projection combination is calculated according to a formula:

$$Z = Z_\alpha \oplus Z_\beta,$$

in which $\oplus$ represents addition of elements in corresponding locations of matrices $Z_\alpha$ and $Z_\beta$.

There are 11 projection combinations in total, and hence 11 linkage features may be obtained.

Figure 4:
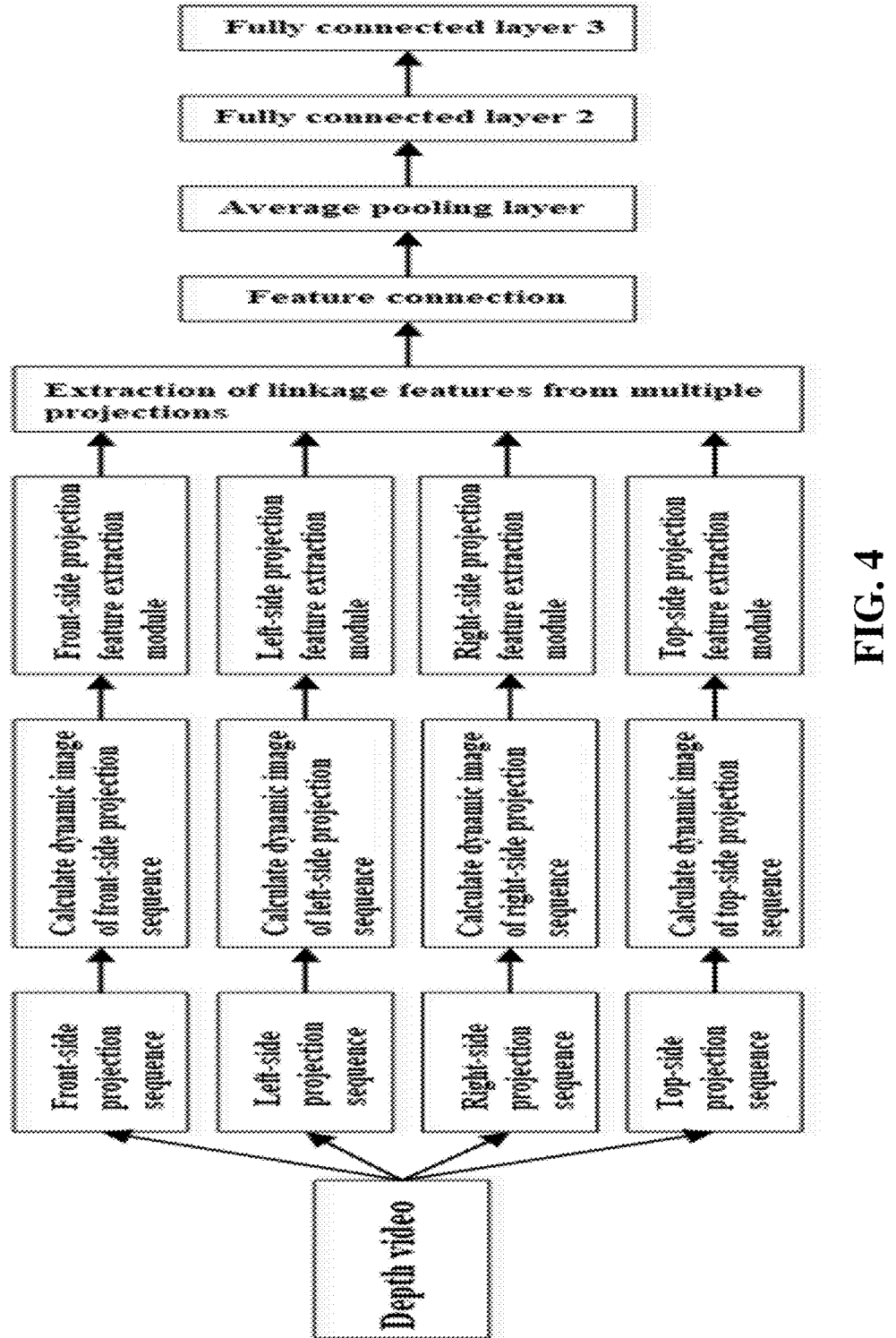
FIG. 4 is a flow chart of a depth video linkage feature-based behavior recognition network.

The depth video linkage feature-based behavior recognition network is constructed in step 6). As shown in FIG. 4, an input of the network is the depth video of the behavior sample, an output thereof is a probability that a corresponding behavior sample belongs to the respective behavior category, i.e., an output of a fully connected layer 3 is $Q_3$. A loss function L of the network is:

$$L = -\sum_{g=1}^{G} \sum_{p=1}^{K} [1_g]_p \log([Q_3^g]_p),$$

in which G is the total number of training behavior samples, K is the quantity of categories of the behavior samples, $$Q_3^g$$

is a network output of a $g^{th}$ behavior sample, $1_g$ is an expected output of the $g^{th}$ behavior sample, and $p^{th}$-dimension data of $1_g$ is defined as:

$$[1_g]_p = \begin{cases} 1, & \text{if } p = l_g \\ 0, & \text{else} \end{cases},$$

in which $l_g$ is a tag value of the $g^{th}$ behavior sample.

In step 7), the depth video of each training behavior sample is inputted into the depth video linkage feature-based behavior recognition network, and the network is trained till convergence.

In step 8), the depth video of each tested behavior sample is inputted into the trained depth video linkage feature-based behavior recognition network to obtain a predicted probability value of a current tested behavior video sample belonging to the respective behavior category, and the behavior category with the largest probability value is the finally predicted behavior category to which the current tested behavior video sample belongs, so as to implement the behavior recognition.

Embodiments

As shown in FIGS. 5A-5D and 6:
1) there are 2,400 samples in total in a behavior sample set, including 8 behavior categories, with 300 samples in each behavior category. Two thirds of the samples in each behavior category are randomly selected and assigned to a training set, and the remaining one third are assigned to a testing set, to obtain a total of 1,600 training samples and 800 testing samples. Each behavior sample consists of all frames in a depth video of the sample. A depth video V of any behavior sample is taken as an example:

$$V = \{I_t | t \in [1, 50]\},$$

in which t represents a time index. There are 50 frames in total in the behavior sample.

$$I_t \in \mathbb{R}^{240 \times 240}$$

is a matrix representation of a $t^{th}$-frame depth image of the depth video V of the behavior sample. The $t^{th}$-frame depth image has 240 rows and 240 columns. $\mathbb{R}$ indicates that a matrix is a real matrix. $I_t(x_i, y_i) = d_i$ represents a depth value of a point $p_i$ with coordinates $(x_i, y_i)$ on the $t^{th}$-frame depth image, i.e., a distance between the point $p_i$ and a depth camera.

The depth video V of the behavior sample is respectively projected onto four planes, including a front side, a right side, a left side and a top side. At this time, the depth video V of the behavior sample may be denoted by a set of four projection sequences, which is expressed by the following formula:

$$V = \{V_{front}, V_{right}, V_{left}, V_{top}\},$$

in which $V_{front}$ represents a projection sequence obtained by projecting the depth video V of the behavior sample onto a front side, $V_{right}$ represents a projection sequence obtained by projecting the depth video V of the behavior sample onto a right side, represents a $V_{left}$ represents a projection sequence obtained by projecting the depth video V of the behavior sample onto a left side, and the $V_{top}$ represents a projection sequence obtained by projecting the depth video V of the behavior sample onto a top side.

$$V_{front} = \{F_t | t \in [1, 50]\}, \text{ in which } F_t \in \mathbb{R}^{240 \times 240}$$

represents a projection graph obtained by projecting the $t^{th}$-frame depth image of the depth video V of the behavior sample onto the front side. An abscissa value $x_i$, an ordinate value $y_i$ and a depth value $d_i$ of the point $p_i$ in the depth image respectively determine an abscissa value $$x_i^f,$$

an ordinate value $$y_i^f$$

and a pixel value $$z_i^f$$

of a point projected from the point $p_i$ onto the projection graph $F_t$, which are denoted by the formulas:

$$F_t(x_i^f, y_i^f) = z_i^f,$$

$$x_i^f = x_i, y_i^f = y_i, z_i^f = f_1(d_i),$$

in which $f_1$ is a linear function indicating that the depth value $d_i$ is mapped to an interval [0,255], such that the smaller the depth value is, the larger the pixel value on the projection graph is, i.e., the closer the point is to the depth camera, the brighter the point is on a front-side projection graph.

$$V_{right} = \{R_t | t \in [1, 50]\}, \text{ in which } R_t \in \mathbb{R}^{240 \times 240}$$

represents a projection graph obtained by projecting the $t^{th}$-frame depth image onto the right side. There may be more than one point projected onto the same location on the projection graph when the depth image is projected onto the right side. A point closest to an observer, i.e., a point furthest from a projection plane, can be seen when a behavior is observed from the right side. Therefore, an abscissa value of the point furthest from the projection plane on the depth image should be reserved, and a pixel value of the point in this location of the projection graph is calculated according to the abscissa value. For this purpose, points in the depth image are traversed column by column from a column with the smallest abscissa x in the depth image in a direction in which x increases, and are projected onto the projection graph. An abscissa value $x_i$, an ordinate value $y_i$ and a depth value $d_i$ of the point $p_i$ in the depth image respectively determine a pixel value $$z_i^r,$$

an ordinate value $$y_i^r$$

and an abscissa value $$x_i^r$$

of a point in the projection graph $R_t$, which are denoted by the formulas:

$$R_t(x_i^r, y_i^r) = z_i^r,$$

$$x_i^r = d_i,\ y_i^r = y_i,\ z_i^r = f_2(x_i),$$

in which $f_2$ is a linear function indicating that the abscissa value $x_i$ is mapped to an interval [0,255]. In a case that x continues to increase, there may be a new point that should be reserved, and the new point and the previously projected point are projected onto the same location in the projection graph, i.e., a pixel value of this location in the projection graph is calculated by using the abscissa value of the point with the largest abscissa value, i.e., $$z_i^r = f_2(x_m),$$

in which $x_m = \max x_i$, $x_i \in X_R$, $X_R$ is a set of abscissas of all points with ordinate values $$y_i^r$$

and depth values $$x_i^r$$

in the depth image, and max $x_i$, $x_i \in X_R$ represents a maximum abscissa value in the set $X_R$.

$$V_{left} = \{L_t | t \in [1, 50]\},\ \text{in which } L_t \in R^{240 \times 240}$$

represents a projection graph obtained by projecting the $t^{th}$-frame depth image onto the left side. Similar to acquisition of the right-side projection graph, in a case that multiple points are projected onto the same location on a left-side projection graph, a point furthest from a projection plane should be reserved. For this purpose, points in the depth image are traversed column by column from a column with the largest abscissa x in the depth image in a direction in which X decreases, and are projected onto the left-side projection graph. An abscissa value $x_i$, an ordinate value $y_i$ and a depth value $d_i$ of the point $p_i$ in the depth image respectively determine a pixel value $$z_i^l,$$

an ordinate value $$y_i^l$$

and an abscissa value $$x_i^l$$

of a point in the projection graph $L_t$. For a point projected onto the same coordinates $$\left(x_i^l, y_i^l\right)$$

on the left-side projection graph, an abscissa value of the point with the smallest abscissa is selected to calculate a pixel value at the coordinates of the projection graph, which is denoted by a formula:

$$L_t\left(x_i^l, y_i^l\right) = z_i^l,$$

$$x_i^l = d_i,\ y_i^l = y_i,\ z_i^l = f_3(x_n),$$

in which $f_3$ is a linear function indicating that an abscissa value $x_n$ is mapped to an interval [0,255], $x_n = \min x_i$, $x_i \in X_L$, in which $X_L$ is a set of abscissas of all points with ordinate values $$y_i^l$$

and depth values $$x_i^l$$

in the depth image, and min $x_i$, $x_i \in X_L$ represents a minimum abscissa value in the set $X_L$.

$$V_{top} = \{T_t | t \in [1, 50]\},\ \text{in which } O_t \in \mathbb{R}^{240 \times 240}$$

represents a projection graph obtained by projecting the $t^{th}$-frame depth image onto the top side. In a case that multiple points are projected onto the same location on a top-side projection graph, a point furthest from a projection plane is reserved. Points in the depth image are traversed column by column from a column with the smallest ordinate y on the depth image in a direction in which y increases, and are projected onto the top-side projection graph. An abscissa value $x_i$, an ordinate value $y_i$ and a depth value $d_i$ of the point $p_i$ in the depth image respectively determine an abscissa value $$X_i^o,$$

a pixel value $$z_i^o$$

and an ordinate value $$y_i^o$$

23 of a point of the point $p_i$ projected onto a projection graph $O_t$. For a point projected onto the same coordinates $$(x_i^o, y_i^o)$$  5 on the projection graph, an ordinate value of the point with the largest ordinate is selected to calculate a pixel value at the coordinates of the projection graph, which is denoted by a formula:  10

$$O_t(x_i^o, y_i^o) = z_i^o,$$
$$x_i^o = x_i, \ y_i^o = d_i, \ z_i^o = f_4(y_q),$$  15 in which $f_4$ is a linear function indicating that an ordinate value $y_q$ is mapped to an interval [0,255]; $y_q = \max y_i$, 20 $y_i \in Y_O$, in which $Y_O$ is a set of ordinates of all points with abscissa values $$x_i^o$$  25 and depth values $$y_i^o$$  30 in the depth image, and max $y_i$, $y_i \in Y_O$ represents a maximum ordinate value in the set $Y_O$.  35

2) dynamic images of four projection sequences of the depth video of each behavior sample are calculated to obtain four dynamic images of each behavior sample. By taking the front-side projection sequence 40 $V_{front} = \{F_t | t \in [1,50]\}$ of the depth video V of the behavior sample as an example, the dynamic image is calculated as follows.

$F_t$ is vectorized first, i.e., a row vector of $F_t$ is connected into a new row vector $i_t$.  45

An arithmetic square root of each element in the row vector $I_t$ is solved to obtain a new vector $w_t$, i.e.:

$$W_t = \sqrt{i_t},$$  50 in which $\sqrt{I_t}$ indicates to solve an arithmetic square root of each element in the row vector $i_t$, $w_t$ is denoted by a 55 vector frame of a $t^{th}$-frame image of the front-side projection sequence $V_{front}$ of the depth video V of the behavior sample.

A feature vector $v_t$ of the $t^{th}$-frame image of the front-side projection sequence $V_{front}$ of the depth video V of the 60 behavior sample is calculated according to a formula:

$$v_t = \frac{1}{t}\sum_{\kappa=1}^{t} w_\kappa,$$  65

24 in which $$\sum_{\kappa=1}^{t} w_\kappa$$

represents summation of frame vectors from a first-frame image to the $t^{th}$-frame image of the front-side projection sequence $V_{front}$ of the depth video V of the behavior sample.

A score $B_t$ of the $t^{th}$-frame image $F_t$ of the front-side 10 projection sequence $V_{front}$ of the depth video V of the behavior sample is calculated according to a formula:

$$B_t = u^T \cdot v_t,$$

in which u is a vector in a dimension of 57600, $u^T$ represents transposition of the vector u, and $u^T \cdot v_t$ indicates to calculate a dot product of the feature vector $v_t$ and a vector obtained by transposing the vector u.

A value of u is calculated, such that frame images in the front-side projection sequence $V_{front}$ have higher and higher scores from front to back, i.e., the larger the t is, the higher 25 the score $B_t$ is. u is calculated by using RankSVM as follows:

$$u = \underset{u}{\arg\min} E(u),$$

$$E(u) = \frac{\lambda}{2}\|u\|^2 + \frac{1}{1225} \times \sum_{c>j} \max\{0, 1 - B_c + B_j\},$$

in which  35

$$\underset{u}{\arg\min} E(u)$$

represents u that minimizes the value of E(u), $\lambda$ is a constant, and $\|u\|^2$ indicates to calculate a sum of squares of each element in the vector u; $B_c$ and $B_j$ respectively represent a score of a $c^{th}$-frame image and a score of a $j^{th}$-frame image 45 of the front-side projection sequence $V_{front}$ of the depth video V of the behavior sample, and $\max\{0,1-B_c+B_j\}$ indicates to choose a larger value of 0 and $1-B_c+B_j$.

In response to calculating the vector u by using RankSVM, the vector u is arranged in an image form with 50 the same size as $F_t$ to obtain $u' \in \mathbb{R}^{240 \times 240}$. $u'$ is a dynamic image of the front-side projection sequence $V_{front}$ of the depth video of the behavior sample. FIGS. 5A-5D show dynamic images of a front-side projection of a hand waving behavior.

The dynamic images of the right-side projection sequence, the left-side projection sequence and the top-side projection sequence of the depth video V of the behavior sample are calculated in the same way as the dynamic images of the front-side projection sequence.  60

3) The dynamic images of the front-side projection sequence, the right-side projection sequence, the left-side projection sequence and the top-side projection sequence of the depth video of the behavior sample are inputted into their respective feature extraction modules for extracting features. The feature extraction module includes a convolution unit 1, a convolution unit 2, a convolution unit 3, a convolution unit 4, a convolution unit 5 and a multi-feature fusion unit.

The convolution unit 1 includes two convolution layers and one maximum pooling layer. Each convolution layer has 64 convolution kernels, and each convolution kernel has a size of 3×3. A pooling kernel of the maximum pooling layer has a size of 2×2. An output of the convolution unit 1 is $C_1$.

The convolution unit 2 includes two convolution layers and one maximum pooling layer. Each convolution layer has 128 convolution kernels, and each convolution kernel has a size of 3×3. A pooling kernel of the maximum pooling layer has a size of 2×2. An input of the convolution unit 2 is $C_1$ and an output thereof is $C_2$.

The convolution unit 3 includes three convolution layers and one maximum pooling layer. Each convolution layer has 256 convolution kernels, and each convolution kernel has a size of 3×3. A pooling kernel of the maximum pooling layer has a size of 2×2. An input of the convolution unit 3 is $C_2$ and an output thereof is $C_3$.

The convolution unit 4 includes three convolution layers and one maximum pooling layer. Each convolution layer has 512 convolution kernels, and each convolution kernel has a size of 3×3. A pooling kernel of the maximum pooling layer has a size of 2×2. An input of the convolution unit 4 is $C_3$ and an output thereof is $C_4$.

The convolution unit 5 includes three convolution layers and one maximum pooling layer. Each convolution layer has 512 convolution kernels, and each convolution kernel has a size of 3×3. A pooling kernel of the maximum pooling layer has a size of 2×2. An input of the convolution unit 5 is $C_4$ and an output thereof is $C_3$.

Inputs of the multi-feature fusion unit are the output C of the convolution unit 1, the output $C_2$ of the convolution unit 2, the output $C_3$ of the convolution unit 3, the output $C_4$ of the convolution unit 4 and the output $C_5$ of the convolution unit 5. The output $C_1$ of the convolution unit 1 is inputted into a maximum pooling layer 1 and a convolution layer 1 in the multi-feature fusion unit. A pooling kernel of the maximum pooling layer 1 has a size of 4×4. The convolution layer 1 has 512 convolution kernels, each convolution kernel has a size of 1×1, and an output of the convolution layer 1 is $M_1$.

The output $C_2$ of the convolution unit 2 is inputted into a maximum pooling layer 2 and a convolution layer 2 in the multi-feature fusion unit. A pooling kernel of the maximum pooling layer 2 has a size of 2×2. The convolution layer 2 has 512 convolution kernels, each convolution kernel has a size of 1×1, and an output of the convolution layer 2 is $M_2$.

The output $C_3$ of the convolution unit 3 is inputted into a convolution layer 3 in the multi-feature fusion unit. The convolution layer 3 has 512 convolution kernels, each convolution kernel has a size of 1×1, and an output of the convolution layer 3 is $M_3$.

The output $C_4$ of the convolution unit 4 is inputted into an up-sampling layer 1 and a convolution layer 4 in the multi-feature fusion unit. The convolution layer 4 has 512 convolution kernels, each convolution kernel has a size of 1×1, and an output of the convolution layer 4 is $M_4$.

The output $C_5$ of the convolution unit 5 is inputted into an up-sampling layer 2 and a convolution layer 5 in the multi-feature fusion unit. The convolution layer 5 has 512 convolution kernels, each convolution kernel has a size of 1×1, and an output of the convolution layer 5 is $M_5$. The output $M_1$ of the convolution layer 1, the output $M_2$ of the convolution layer 2, the output $M_3$ of the convolution layer 3, the output $M_4$ of the convolution layer 4 and the output $M_5$ of the convolution layer 5 are connected by channel and inputted into a convolution layer 6. The convolution layer 6 has 256 convolution kernels, each convolution kernel has a size of 1×1, and an output of the convolution layer 6 is $M_6$. An output of the multi-feature fusion unit is the output $M_6$ of the convolution layer 6.

Dynamic images of the front-side projection sequence, the right-side projection sequence, the left-side projection sequence and the top-side projection sequence of the depth video V of the behavior sample are respectively inputted into their respective feature extraction modules, namely, a front-side projection feature extraction module, a right-side projection feature extraction module, a left-side projection feature extraction module and a top-side projection feature extraction module. The four feature extraction modules are of the same structure. However, during network training, the four modules do not share parameters. The four feature extraction modules respectively output features $Q^f$, $Q^r$, $Q^l$ and $Q^t$, which respectively represent a feature that is extracted when the dynamic image of the front-side projection sequence of the depth video V of the behavior sample is inputted into the front-side projection feature extraction module, a feature that is extracted when the dynamic image of the right-side projection sequence of the depth video V of the behavior sample is inputted into the right-side projection feature extraction module, a feature that is extracted when the dynamic image of the left-side projection sequence of the depth video V of the behavior sample is inputted into the left-side projection feature extraction module, and a feature that is extracted when the dynamic image of the top-side projection sequence of the depth video V of the behavior sample is inputted into the top-side projection feature extraction module.

4) The features extracted by all the feature extraction modules are inputted into the multi-projection linkage feature extraction module, and a linkage feature of each projection combination is extracted. Every two, every three and every four of the features extracted in response to the dynamic images of the four projection sequences being inputted into the respective feature extraction modules are combined to obtain a total of 11 projection combinations. A combination of the features extracted from the dynamic images of the front-side projection sequence and of the left-side projection sequence is denoted by a 1-2 projection combination. A combination of the features extracted from the dynamic images of the front-side projection sequence and of the right-side projection sequence is denoted by a 1-3 projection combination. A combination of the features extracted from the dynamic images of the front-side projection sequence and of the top-side projection sequence is denoted by a 1-4 projection combination. A combination of the features extracted from the dynamic images of the left-side projection sequence and of the right-side projection sequence is denoted by a 2-3 projection combination. A combination of the features extracted from the dynamic images of the left-side projection sequence and of the top-side projection sequence is denoted by a 2-4 projection combination. A combination of the features extracted from the dynamic images of the right-side projection sequence and of the top-side projection sequence is denoted by a 3-4 projection combination. A combination of the features extracted from the dynamic images of the front-side projection sequence, of the left-side projection sequence and of the right-side projection sequence is denoted by a 1-2-3 projection combination. A combination of the features extracted from the dynamic images of the front-side projection sequence, of the left-side projection sequence and of the top-side projection sequence is denoted by a 1-2-4 projection combination. A combination of the features extracted from the dynamic images of the front-side projection sequence, of the right-side projection sequence and of the top-side projection sequence is denoted by a 1-3-4 projection combination. A combination of the features extracted from the dynamic images of the left-side projection sequence, of the right-side projection sequence and of the top-side projection sequence is denoted by a 2-3-4 projection combination. A combination of the features extracted from the dynamic images of the front-side projection sequence, of the left-side projection sequence, of the right-side projection sequence and of the top-side projection sequence is denoted by a 1-2-3-4 projection combination.

The linkage feature of each projection combination is calculated. By taking the 1-2 projection combination as an example, its linkage feature is calculated as follows:

The features $Q^f$ and $Q^l$ in the 1-2 projection combination are connected by channel to obtain a combined feature $Q \in \mathbb{R}^{H \times W \times 512}$, in which H and W represent a height and a width of $Q^f$ and $Q^l$.

An explicit linkage feature of the projection combination is first calculated by the following steps:

(1) calculating an average value of features of each channel and an average value $\overline{Q}_a$ of features of an $a^{th}$ channel of the combined feature $Q$ according to a formula:

$$\overline{Q}_a = \frac{1}{H \times W} \sum_{h,w}^{H,W} Q_{a,h,w},$$

in which $Q_{a,h,w}$ represents an $h^{th}$-row and $w^{th}$-column element value of the $a^{th}$ channel of the combined feature $Q$;

(2) calculating a degree of explicit correlation $P \in \mathbb{R}^{512 \times 512}$ of features between different channels of the combined feature $Q$, a degree of explicit correlation $P^{a,b}$ of features between the $a^{th}$ channel and a $b^{th}$ channel being calculated according to a formula:

$$P^{a,b} = \frac{1}{H \times W} \sum_{h,w}^{H,W} (Q_{a,h,w} - \overline{Q}_a)(Q_{b,h,w} - \overline{Q}_b),$$

in which $Q_{b,h,w}$ represents an $h^{th}$-row and $w^{th}$-column element value of the $b^{th}$ channel of the combined feature $Q$, and $$\overline{Q}_b$$

represents an average value of features of the $b^{th}$ channel of the combined feature $Q$;

3) calculating a degrees of normalized explicit correlation $$\hat{P} \in \mathbb{R}^{512 \times 512}$$

of features between the different channels of the combined feature $Q$, a degree of normalized explicit correlation $$\hat{P}_{a,b}$$

of features between the $a^{th}$ channel and the $b^{th}$ channel being calculated according to a formula:

$$\hat{P}^{a,b} = \frac{e^{P^{a,b}}}{\sum_{b=1}^{512} e^{P^{a,b}}};$$

and 4) calculating an explicit linkage feature $$Z_\alpha \in \mathbb{R}^{H \times W \times 512}$$

of the projection combination, a feature $$Z_\alpha^a$$

of the $a^{th}$ channel of $Z_\alpha$ being calculated according to a formula:

$$Z_\alpha^a = \sum_{b=1}^{512} \hat{P}^{a,b} Q_b,$$

in which $Q_b$ represents a feature of the $b^{th}$ channel of the combined feature $Q$.

After that, an implicit linkage feature of each projection combination is calculated by the following steps:

(1) calculating an average value of each channel of the combined feature $Q$, and connecting the average values of all the channels into a vector $$\overline{Q} = (\overline{Q}_1, \overline{Q}_2, \ldots, \overline{Q}_{512});$$

(2) inputting the vector $\overline{Q}$ into the fully connected layer 1, the fully connected layer 1 having 512 neurons, an output of the fully connected layer 1 being $$S_1 = \phi_{sigmoid}(W_1 \cdot \overline{Q} + \theta_1) \in \mathbb{R}^{512 \times 1},$$

in which $\phi_{sigmoid}$ represents an activation function sigmoid, $W_1 \in \mathbb{R}^{512 \times 512}$ represents a weight of the fully connected layer 1, and $\theta_1 \in \mathbb{R}^{512 \times 1}$ represents a bias vector of the fully connected layer 1; and (3) calculating an implicit linkage feature $Z_\beta \in \mathbb{R}^{H \times W \times 512}$ of the projection combination, a feature $$Z_\beta^a$$

of an $a^{th}$ channel of $Z_\beta$ being calculated according to a formula:

$$Z_\beta^a = S_1^a \cdot Q_a,$$

in which $$S_1^a$$

represents a value of an $a^{th}$ element of the output $S_1$ of the fully connected layer 1.

Finally, a linkage feature Z of the 1-2 projection combination is calculated according to a formula:

$$Z = Z_\alpha \oplus Z_\beta,$$

in which represents addition of elements in corresponding locations of matrices $Z_\alpha$ and $Z_\beta$.

There are 11 projection combinations in total, and hence 11 linkage features may be obtained by the calculation method described above.

5) The linkage features of the 11 projection combinations obtained are connected by channel, and inputted into the average pooling layer. An output T of the average pooling layer is inputted into a fully connected layer 2. The fully connected layer 2 has 1,024 neurons. An output $S_2$ of the fully connected layer 2 is calculated as follows:

$$S_2 = \phi_{relu}(W_2 \cdot \Gamma + \theta_2),$$

in which $\phi_{relu}$ is an activation function relu, $W_2$ is a weight of the fully connected layer 2, and $\theta_2$ is a bias vector of the fully connected layer 2.

An output $S_2$ of the fully connected layer 2 is inputted into a fully connected layer 3 with an activation function softmax. The fully connected layer 3 has 8 neurons. An output $S_3$ of the fully connected layer 3 is calculated as follows:

$$S_3 = \phi_{softmax}(W_3 \cdot S_2 + \theta_3),$$

in which $\phi_{softmax}$ represents the activation function softmax, $W_3$ is a weight of the fully connected layer 3, and $\theta_3$ is a bias vector of the fully connected layer 3.

6) A depth video linkage feature-based behavior recognition network is constructed. An input of the network is the depth video of the behavior sample, and an output thereof is a probability that a corresponding behavior sample belongs to the respective behavior category, i.e., the output of the fully connected layer 3 is $Q_3$. A loss function L of the network is:

$$L = -\sum_{g=1}^{2400} \sum_{p=1}^{8} [1_g]_p \log([Q_3^g]_p),$$

in which $$Q_3^g$$

is a network output of a $g^{th}$ behavior sample, $1_g$ is an expected output of the $g^{th}$ behavior sample, and $p^{th}$-dimension data of $1_g$ is defined as:

$$[1_g]_p = \begin{cases} 1, & \text{if } p = l_g \\ 0, & \text{else} \end{cases},$$

in which $l_g$ is a tag value of the $g^{th}$ behavior sample.

7) A depth video of each training behavior sample is inputted into the depth video linkage feature-based behavior recognition network, and the network is trained till convergence.

8) A depth video of each tested behavior sample is inputted into the trained depth video linkage feature-based behavior recognition network to obtain a predicted probability value of a current tested behavior video sample belonging to the respective behavior category. The behavior category with the largest probability value is taken as the finally predicted behavior category to which the current tested behavior video sample belongs, so as to implement the behavior recognition.

The activation function relu has a formula $f(x)=\max(0,x)$. An input of the function is x, and an output thereof is the larger one of x and 0.

The activation function softmax has a formula $$S_i = \frac{e^i}{\sum_{j=1}^{n} e^j},$$

in which i represents an output of an $i^{th}$ neuron in the fully connected layer, j represents an output of a $j^{th}$ neuron in the fully connected layer, n represents the quantity of neurons in the fully connected layer, and $S_i$ represents an output of the $i^{th}$ neuron in the fully connected layer according to the activation function softmax.

The activation function sigmoid has a formula $$f(x) = \frac{1}{1 + e^{-x}}.$$

An input of the function is x, and an output thereof is $$\frac{1}{1 + e^{-x}}.$$

x represents the input of the activation function sigmoid and $f(x)$ represents the output of the activation function sigmoid.

It should be noted that, in this context, relational terms such as "first" and "second" are used merely to distinguish one entity or operation from another entity or operation, and do not necessarily require or imply any actual relationship or order between these entities or operations. The term "including", "include" or any other variants thereof is intended to cover a non-exclusive inclusion, such that a process, method, article or device that includes a series of elements includes not only those elements but also other elements that are not specifically listed, or further includes elements that are inherent to such a process, method, item or device.

Although the embodiments of the present invention have been shown and described, it should be understood by those of ordinary skill in the art that various changes, modifications, substitutions and variations of theses embodiments may be made without departing from the principle and spirit of the present invention. The scope of the present invention is defined by the appended claims and equivalents thereof.

The invention claimed is:

1. A depth video linkage feature-based behavior recognition method, comprising the following steps:

1) Projecting a depth video of each behavior sample onto a front side, a right side, a left side and a top side to obtain corresponding projection sequences;

2) Obtaining a dynamic image of each behavior sample by calculating a dynamic image of each projection sequence;

3) Inputting the dynamic image of each behavior sample into a respective feature extraction module and extracting features;

4) Inputting the extracted features into a multi-projection linkage feature extraction module and extracting a linkage feature of each projection combination;

5) Connecting the extracted linkage features of all the projection combinations by channel, and inputting the connected features into an average pooling layer and a fully connected layer;

6) Constructing a depth video linkage feature-based behavior recognition network;

7) Inputting a depth video of each training behavior sample into the depth video linkage feature-based behavior recognition network, and training the network till convergence; and 8) Inputting a depth video of each behavior sample to be tested into the trained behavior recognition network to implement behavior recognition.

2. The depth video linkage feature-based behavior recognition method according to claim 1, wherein the projection sequence is obtained in step 1) as follows:

acquiring a depth video of any behavior sample, each behavior sample consisting of all frames in the depth video of the behavior sample, $$V = \{I_t | t \in [1, N]\},$$

in which t represents a time index, and N is a total number of frames of the depth video V of the behavior sample; $I_t \in \mathbb{R}^{R \times C}$ is a matrix representation of a $t^{th}$-frame depth image of the depth video V of the behavior sample, in which R and C correspond to the number of rows and the number of columns of the matrix representation of the $t^{th}$-frame depth image respectively, and indicates that a matrix is a real matrix; $I_t(x_i, y_i) = d_i$ represents a depth value of a point $p_i$ with coordinates $(x_i, y_i)$ on the $t^{th}$-frame depth image, i.e., a distance between the point $p_i$ and a depth camera; and $d_i \in [0,D]$ in which D represents the furthest distance detectable by the depth camera;

the depth video V of the behavior sample is expressed as a set of projection sequences, which is denoted by a formula:

$$V = \{V_{front}, V_{right}, V_{left}, V_{top}\},$$

in which $V_{front}$ represents a projection sequence obtained by projecting the depth video V of the behavior sample onto a front side, $V_{right}$ represents a projection sequence obtained by projecting the depth video V of the behavior sample onto a right side, $V_{left}$ represents a projection sequence obtained by projecting the depth video V of the behavior sample onto a left side, and the $V_{top}$ represents a projection sequence obtained by projecting the depth video V of the behavior sample onto a top side;

the projection sequence $V_{front}$ is acquired as follows:

$V_{front} = \{F_t | t \in [1,N]\}$, in which $F_t \in \mathbb{R}^{R \times C}$ represents a projection graph obtained by projecting the $t^{th}$-frame depth image of the depth video V of the behavior sample onto the front side; an abscissa value $x_i$, an ordinate value $y_i$ and a depth value $d_i$ of the point $p_i$ in the depth image respectively determine an abscissa value $$x_i^f,$$

an ordinate value $$y_i^f$$

and a pixel value $$z_i^f$$

of a point projected from the point $p_i$ onto the projection graph $F_t$, which are denoted by formulas:

$$F_t(x_i^f, y_i^f) = z_i^f,$$

$$x_i^f = x_i, y_i^f = y_i, z_i^f = f_1(d_i),$$

in which $f_1$ is a linear function indicating that the depth value $d_i$ is mapped to an interval [0,255], such that the smaller the depth value of a point is, the larger the pixel value of the point on the projection graph is, i.e., the closer the point is to the depth camera, the brighter the point is on a front-side projection graph;

the projection sequence $V_{right}$ is acquired as follows:

$V_{right} = \{R_t | t \in [1,N]\}$, in which $R_t \in \mathbb{R}^{R \times D}$ represents a projection graph obtained by projecting the $t^{th}$ frame depth image on the right side; at least one point is projected onto the same location on the projection graph when the depth image is projected onto the right side; a point closest to an observer, i.e., a point furthest from a projection plane, is seen when a behavior is observed from the right side; an abscissa value of the point, furthest from the projection plane, on the depth image is reserved, and a pixel value of the point in this location of the projection graph is calculated according to the abscissa value; points in the depth image are traversed column by column from a column with the smallest abscissa x on the depth image in a direction in which x increases, and are projected onto the projection graph; an abscissa value $x_i$, an ordinate value $y_i$ and a depth value $d_i$ of the point $p_i$ in the depth image respectively determine a pixel value $$z_i^r,$$

an ordinate value $$y_i^r$$

and an abscissa value $$x_i^r$$

of a point in the projection graph $R_t$, which are denoted by formulas:

$$R_t(x_i^r, y_i^r) = z_i^r,$$

$$x_i^r = d_i, \ y_i^r = y_i, \ z_i^r = f_2(x_i),$$

in which $f_2$ is a linear function indicating that the abscissa value $x_i$ is mapped to an interval [0,255]; in a case that x continues to increase, a new point is reserved if the new point and the previously projected point are projected onto the same location in the projection graph, i.e., a pixel value of this location in the projection graph is calculated by using the abscissa value of the point with the largest abscissa value, i.e., $$z_i^r = f_2(x_m), \text{ in which } x_m = \max \ x_i, \ x_i \in X_R, \ X_R$$

is a set of abscissas of all points with ordinate values $$y_i^r$$

and depth values $$x_i^r$$

in the depth image, and max $x_i$, $x_i \in X_R$ represents a maximum abscissa value in the set $X_R$;

the projection sequence $V_{left}$ is acquired as follows:

$V_{left} = \{L_t | t \in [1,N]\}$, in which $L_t \in {}^{R \times D}$ represents a projection graph obtained by projecting the $t^{th}$-frame depth image onto the left side; in a case that multiple points are projected onto the same location on a left-side projection graph, a point furthest from a projection plane is reserved; points in the depth image are traversed column by column from a column with the largest abscissa x on the depth image in a direction in which x decreases, and are projected onto the left-side projection graph; an abscissa value $x_i$, an ordinate value $y_i$ and a depth value $d_i$ of the point $p_i$ in the depth image respectively determine a pixel value $$z_i^l,$$

an ordinate value $$y_i^l$$

and an abscissa value $$x_i^l$$

of a point in the projection graph $L_t$; for a point projected onto the same coordinates $$\left(x_i^l, y_i^l\right)$$

on the left-side projection graph, an abscissa value of the point with the smallest abscissa is selected to calculate a pixel value at the coordinates of the projection graph, which is denoted by formulas:

$$L_t\left(x_i^l, y_i^l\right) = z_i^l,$$

$$x_i^l = d_i, \ y_i^l = y_i, \ z_i^l = f_3(x_n),$$

in which $f_3$ is a linear function indicating that an abscissa value $x_n$ is mapped to an interval [0, 255]; $x_n = \min \ x_i$, $x_i \in X_L$, in which $X_L$ is a set of abscissa of all points with ordinate values $$y_i^l$$

and depth values $$x_i^l$$

in the depth image, and min $x_i$, $x_i \in X_L$ represents a minimum abscissa value in the set $X_L$;

the projection sequence $V_{top}$ is acquired as follows:

$V_{top} = \{T_t | t \in [1,N]\}$, in which $O_t \in {}^{D \times C}$ represents a projection graph obtained by projecting the $t^{th}$-frame depth image onto the top side; in a case that multiple points are projected onto the same location on a top-side projection graph, a point furthest from the projection plane is reserved; points in the depth image are traversed column by column from a column with the smallest ordinate y on the depth image in a direction in which y increases, and are projected onto the top-side projection graph; an abscissa value $x_i$, an ordinate value $y_i$ and a depth value $d_i$ of the point $p_i$ in the depth image respectively determine an abscissa value $$x_i^o,$$

a pixel value $$z_i^o$$

and an ordinate value $$y_i^o$$

of a point of the point $p_i$ projected onto the projection graph $O_t$; for a point projected onto the same coordinates $$(x_i^o, y_i^o)$$

on the projection graph, an ordinate value of the point with the largest ordinate is selected to calculate a pixel value at the coordinates of the projection graph, which is denoted by formulas:

$$O_t(x_i^o, y_i^o) = z_i^o,$$

$$x_i^o = x_i, y_i^o = d_i, z_i^o = f_4(y_q),$$

in which $f_4$ is a linear function indicating that an ordinate value $y_q$ is mapped to an interval [0, 255], $y_q = \max y_i$, $y_i \in Y_O$, in which $Y_O$ is a set of ordinates of all points with abscissa values $$x_i^o$$

and depth values $$y_i^o$$

in the depth image, and max $y_i$, $y_i \in Y_O$ represents a maximum ordinate value in the set $Y_O$.

3. The depth video linkage feature-based behavior recognition method according to claim 1, wherein the dynamic image is calculated in step 2) as follows:

by taking a front-side projection sequence $V_{front} = \{F_t | t \in [1,N]\}$ of the depth video V of the behavior sample as an example, vectorizing $F_t$ first, i.e., connecting a row vector of $F_t$ into a new row vector $i_t$;

solving an arithmetic square root of each element in the row vector $i_t$ to obtain a new vector $w_t$, i.e.:

$$w_t = \sqrt{i_t},$$

in which $\sqrt{i_t}$ indicates to solve an arithmetic square root of each element in the row vector $i_t$, and $w_t$ is denoted by a frame vector of a $t^{th}$-frame image of the front-side projection sequence $V_{front}$ of the depth video V of the behavior sample;

calculating a feature vector $v_t$ of the $t^{th}$-frame image of the front-side projection sequence $V_{front}$ of the depth video V of the behavior sample according to a formula:

$$v_t = \frac{1}{t} \sum\nolimits_{\kappa=1}^t w_\kappa,$$

in which $$\sum\nolimits_{\kappa=1}^t w_\kappa$$

represents summation of frame vectors from a first-frame image to the $t^{th}$-frame image of the front-side projection sequence $V_{front}$ of the depth video V of the behavior sample;

calculating a score $B_t$ of the $t^{th}$-frame image $F_t$ of the front-side projection sequence $V_{front}$ of the depth video V of the behavior sample according to a formula:

$$B_t = u^T \cdot v_t,$$

in which u is a vector of a dimension A, A=R×C, $u^T$ represents transposition of the vector u, and $u^T \cdot v_t$ indicates to calculate a dot product of the feature vector $v_t$ and a vector obtained by transposing the vector u;

calculating a value of u, such that frame images in the front-side projection sequence $V_{front}$ have higher and higher scores from front to back, i.e., the larger the t is, the higher the score $B_t$ is, u being calculated by using RankSVM as follows:

$$u = \arg\min_u E(u),$$

$$E(u) = \frac{\lambda}{2}\|u\|^2 + \frac{2}{T(T-1)} \times \sum_{c>j} \max\{0, 1 - B_c + B_j\},$$

in which $$\arg\min_u E(u)$$

represents u that minimizes the value of E(u), $\lambda$ is a constant, and $\|u\|^2$ indicates to calculate a sum of squares of each element in the vector u; $B_c$ and $B_j$ respectively represent a score of a $c^{th}$-frame image and a score of a $j^{th}$-frame image of the front-side projection sequence $V_{front}$ of the depth video V of the behavior sample, and $\max\{0, 1 - B_c + B_j\}$ indicates to choose a larger value of 0 and $1 - B_c + B_j$; and in response to calculating the vector u by using RankSVM, arranging the vector u in an image form with the same size as $F_t$ to obtain $u' \in R \times C$, u' being a dynamic image of the front-side projection sequence $V_{front}$ of the depth video V of the behavior sample.

4. The depth video linkage feature-based behavior recognition method according to claim 1, wherein the feature extraction module comprises a convolution unit 1, a convolution unit 2, a convolution unit 3, a convolution unit 4, a convolution unit 5 and a multi-feature fusion unit; wherein outputs of the convolution unit 1, the convolution unit 2, the convolution unit 3, the convolution unit 4 and the convolution unit 5 are sequentially inputted into the multi-feature fusion unit, and a final output of the multi-feature fusion unit is $M_6$;

the convolution unit 1 comprises two convolution layers and one maximum pooling layer, each convolution layer has 64 convolution kernels, each convolution kernel has a size of 3×3, a pooling kernel of the maximum pooling layer has a size of 2×2, and an output of the convolution unit 1 is $C_1$, the convolution unit 2 comprises two convolution layers and one maximum pooling layer, each convolution layer has 128 convolution kernels, each convolution kernel has a size of 3×3, a pooling kernel of the maximum pooling layer has a size of 2×2, and an input of the convolution unit 2 is $C_1$ and an output thereof is $C_2$;

the convolution unit 3 comprises three convolution layers and one maximum pooling layer, each convolution layer has 256 convolution kernels, each convolution kernel has a size of 3×3, a pooling kernel of the maximum pooling layer has a size of 2×2, and an input of the convolution unit 3 is 2 and an output thereof is $C_3$;

the convolution unit 4 comprises three convolution layers and one maximum pooling layer, each convolution layer has 512 convolution kernels, each convolution kernel has a size of 3×3, a pooling kernel of the maximum pooling layer has a size of 2×2, and an input of the convolution unit 4 is $C_3$ and an output thereof is $C_4$;

the convolution unit 5 comprises three convolution layers and one maximum pooling layer, each convolution layer has 512 convolution kernels, each convolution kernel has a size of 3×3, a pooling kernel of the maximum pooling layer has a size of 2×2, and an input of the convolution unit 5 is $C_4$ and an output thereof is $C_5$;

inputs of the multi-feature fusion unit are the output $C_1$ of the convolution unit 1, the output $C_2$ of the convolution unit 2, the output 3 of the convolution unit 3, the output $C_4$ of the convolution unit 4 and the output $C_5$ of the convolution unit 5; the output $C_1$ of the convolution unit 1 is inputted into a maximum pooling layer 1 and a convolution layer 1 in the multi-feature fusion unit, a pooling kernel of the maximum pooling layer 1 has a size of 4×4, the convolution layer 1 has 512 convolution kernels, each convolution kernel has a size of 1×1, and an output of the convolution layer 1 is $M_1$;

the output $C_2$ of the convolution unit 2 is inputted into a maximum pooling layer 2 and a convolution layer 2 in the multi-feature fusion unit, a pooling kernel of the maximum pooling layer 2 has a size of 2×2, the convolution layer 2 has 512 convolution kernels, each convolution kernel has a size of 1×1, and an output of the convolution layer 2 is $M_2$;

the output $C_3$ of the convolution unit 3 is inputted into a convolution layer 3 in the multi-feature fusion unit, the convolution layer 3 has 512 convolution kernels, each convolution kernel has a size of 1×1, and an output of the convolution layer 3 is $M_3$;

the output $C_4$ of the convolution unit 4 is inputted into an up-sampling layer 1 and a convolution layer 4 in the multi-feature fusion unit, the convolution layer 4 has 512 convolution kernels, each convolution kernel has a size of 1×1, and an output of the convolution layer 4 is $M_4$:

the output $C_5$ of the convolution unit 5 is inputted into an up-sampling layer 2 and a convolution layer 5 in the multi-feature fusion unit, the convolution layer 5 has 512 convolution kernels, each convolution kernel has a size of 1×1, and an output of the convolution layer 5 is $M_5$; the output $M_1$ of the convolution layer 1, the output $M_2$ of the convolution layer 2, the output $M_3$ of the convolution layer 3, the output $M_4$ of the convolution layer 4 and the output $M_5$ of the convolution layer 5 are connected by channel and inputted into a convolution layer 6; the convolution layer 6 has 256 convolution kernels, each convolution kernel has a size of 1×1, an output of the convolution layer 6 is $M_6$, and an output of the multi-feature fusion unit is the output $M_6$ of the convolution layer 6;

dynamic images of the front-side projection sequence, the right-side projection sequence, the left-side projection sequence and the top-side projection sequence of the depth video V of the behavior sample are respectively inputted into respective feature extraction modules, namely, a front-side projection feature extraction module, a right-side projection feature extraction module, a left-side projection feature extraction module and a top-side projection feature extraction module, and during network training, the modules described above do not share parameters, and the feature extraction modules described above respectively output features $Q^f$, $Q^r$, $Q^l$ and $Q^t$;

$Q^f$ represents a feature that is extracted when the dynamic image of the front-side projection sequence of the depth video V of the behavior sample is inputted into the front-side projection feature extraction module, $Q^r$ represents a feature that is extracted when the dynamic image of the right-side projection sequence of the depth video V of the behavior sample is inputted into the right-side projection feature extraction module, $Q^l$ represents a feature that is extracted when the dynamic image of the left-side projection sequence of the depth video V of the behavior sample is inputted into the left-side projection feature extraction module, and $Q^t$ represents a feature that is extracted when the dynamic image of the top-side projection sequence of the depth video V of the behavior sample is inputted into the top-side projection feature extraction module.

5. The depth video linkage feature-based behavior recognition method according to claim 1, wherein the linkage feature is extracted in step 4) by combining every two, every three and every four of the features extracted by each feature extraction module in step 3) to obtain multiple projection combinations;

a linkage feature of each projection combination is calculated as follows:

connecting the features in the projection combination by channel to obtain a combined feature $Q \in \mathbb{R}^{H \times W \times \gamma J}$, in which H and W represent a height and a width of each feature in the projection combination respectively, J represents the number of channels of each feature in the projection combination, and $\gamma$ represents the number of features in the projection combination; calculating an explicit linkage feature $Z_\alpha$ of each projection combination and an implicit linkage feature $Z_\beta$ of each projection combination; and calculating a linkage feature Z of the projection combination according to a formula:

$$Z = Z_\alpha \oplus Z_\beta,$$

in which $\oplus$ represents addition of elements in corresponding positions of matrices $Z_\alpha$ and $Z_\beta$.

6. The depth video linkage feature-based behavior recognition method according to claim 1, wherein in step 5), the linkage features of all the projection combinations are connected by channel, and inputted into the average pooling layer, an output $\Gamma$ of the average pooling layer is inputted into the fully connected layer 2, the quantity of neurons in the fully connected layer 2 is $D_2$, and an output $S_2$ of the fully connected layer 2 is calculated as follows:

$$S_2 = \phi_{relu}(W_2 \cdot \Gamma + \theta_2),$$

in which $\phi_{relu}$ is an activation function relu, $W_2$ is a weight of the fully connected layer 2, and $\theta_2$ is a bias vector of the fully connected layer 2;

the output $S_2$ of the fully connected layer 2 is inputted into a fully connected layer 3 with an activation function softmax, the quantity of neurons in the fully connected layer 3 is K, and an output $S_3$ is calculated as follows:

$$S_3 = \phi_{softmax}(W_3 \cdot S_2 + \theta_3),$$

in which $\phi_{softmax}$ represents the activation function softmax, $W_3$ is a weight of the fully connected layer 3, and $\theta_3$ is a bias vector of the fully connected layer 3.

7. The depth video linkage feature-based behavior recognition method according to claim 1, wherein an input of the depth video linkage feature-based behavior recognition network in step 6) is the depth video of the behavior sample, an output thereof is a probability that a corresponding behavior sample belongs to the respective behavior category, i.e., the output $Q_3$ of the fully connected layer 3, and a loss function L of the network is:

$$L = -\sum_{g=1}^{G}\sum_{p=1}^{K} [l_g]_p \log([Q_3^g]_p),$$

in which G is a total quantity of training behavior samples, K is the quantity of categories of behavior samples, $$Q_3^g$$

is a network output of a $g^{th}$ behavior sample, $l_g$ is an expected output of the $g^{th}$ behavior sample, and $p^{th}$-dimension data of $l_g$ is defined as:

$$[l_g]_p = \begin{cases} 1, & \text{if } p = l_g, \\ 0, & \text{else} \end{cases},$$

in which $l_g$ is a tag value of the $g^{th}$ behavior sample.

8. The depth video linkage feature-based behavior recognition method according to claim 1, wherein the behavior recognition in step 8) comprises: inputting a depth video of each tested behavior sample into the trained depth video linkage feature-based behavior recognition network to obtain a predicted probability value of a current tested behavior video sample belonging to the respective behavior category, and taking the behavior category with the largest probability value as the finally predicted behavior category to which the current tested behavior video sample belongs, so as to implement the behavior recognition.

9. The depth video linkage feature-based behavior recognition method according to claim 5, wherein the explicit linkage feature of each projection combination is calculated by the following steps:

1) Calculating an average value of features of each channel and an average value $$\bar{Q}_a$$

of features of an $a^{th}$ channel of the combined feature Q according to a formula:

$$\bar{Q}_a = \frac{1}{H \times W} \sum_{h,w}^{H,W} Q_{a,h,w},$$

in which $Q_{a,h,w}$ represents an $h^{th}$-row and $w^{th}$-column element value of the $a^{th}$ channel of the combined feature Q;

2) Calculating a degree of explicit correlation $P \in \gamma^{J \times \gamma J}$ of features between different channels of the combined feature Q, a degree of explicit correlation $P^{a,b}$ of features between the $a^{th}$ channel and a $b^{th}$ channel being calculated according to a formula:

$$P^{a,b} = \frac{1}{H \times W} \sum_{h,w}^{H,W} (Q_{a,h,w} - \bar{Q}_a)(Q_{b,h,w} - \bar{Q}_b),$$

in which $Q_{b,h,w}$ represents an $h^{th}$-row and $w^{th}$-column element value of the $b^{th}$ channel of the combined feature Q, and $\bar{Q}_b$ represents an average value of features of the $b^{th}$ channel of the combined feature Q;

3) Calculating a degree of normalized explicit correlation $$\hat{P} \in \gamma^{J \times \gamma J}$$

of features between the different channels of the combined feature Q, a degree of normalized explicit correlation $$\hat{P}^{a,b}$$

of features between the $a^{th}$ channel and the $b^{th}$ channel being calculated according to a formula:

$$\hat{P}^{a,b} = \frac{e^{P^{a,b}}}{\sum_{b=1}^{\gamma J} e^{P^{a,b}}};$$

and 4) calculating an explicit linkage feature $$Z_\alpha \in {}^{H \times W \times \gamma J}$$

of the projection combination, a feature $$Z_\alpha^a$$

of the $a^{th}$ channel of $Z_\alpha$ being calculated according to a formula:

$$Z_\alpha^a = \sum_{b=1}^{\gamma J} \hat{P}^{a,b} Q_b,$$

in which $Q_b$ represents a feature of the $b^{th}$ channel of the combined feature Q.

10. The depth video linkage feature-based behavior recognition method according to claim 5, wherein the implicit linkage feature of each projection combination is calculated by the following steps:

1) Calculating an average value of each channel of the combined feature Q, and connecting the average values of all the channels into a vector $$\overline{Q} = (\overline{Q}_1, \overline{Q}_2, \ldots, \overline{Q}_{\gamma J});$$

2) Inputting the vector $\overline{Q}$ into the fully connected layer 1, the number of neurons of the fully connected layer 1 being $\gamma J$, an output of the fully connected layer 1 being $$S_1 - \phi_{sigmoid}\left(W_1 \cdot \overline{Q} + \theta_1\right) \in {}^{\gamma J \times 1},$$

in which $\phi_{sigmoid}$ represents an activation function sigmoid, $$W_1 \in {}^{\gamma J \times \gamma J}$$

represents a weight of the fully connected layer 1, and $$\theta_1 \in {}^{\gamma J+1}$$

represents a bias vector of the fully connected layer 1; and

3) Calculating an implicit linkage feature $$Z_\beta \in {}^{H \times W \times \gamma J}$$

of the projection combination, a feature $$Z_\beta^a = S_1^a \cdot Q_a,$$

of an $a^{th}$ channel of $Z_\beta$ being calculated according to a formula:

$$Z_\beta^a = S_1^a \cdot Q_a,$$

in which $$S_1^a$$

represents a value of an $a^{th}$ element of the output $S_1$ of the fully connected layer 1.

\* \* \* \* \*